United States Patent
Mason

(10) Patent No.: US 10,253,421 B2
(45) Date of Patent: Apr. 9, 2019

(54) ELECTROCHEMICAL CELL, METHOD OF FABRICATING THE SAME AND METHOD OF GENERATING CURRENT

(71) Applicant: TUM CREATE LIMITED, Singapore (SG)

(72) Inventor: Chad William Mason, Fessenden, ND (US)

(73) Assignee: Chad William Mason, Fessenden, ND (US)

( * ) Notice: Subject to any disclaimer, the term of this patent is extended or adjusted under 35 U.S.C. 154(b) by 525 days.

(21) Appl. No.: 14/758,643

(22) PCT Filed: Dec. 31, 2013

(86) PCT No.: PCT/SG2013/000561
§ 371 (c)(1),
(2) Date: Jun. 30, 2015

(87) PCT Pub. No.: WO2014/104980
PCT Pub. Date: Jul. 3, 2014

(65) Prior Publication Data
US 2015/0354071 A1    Dec. 10, 2015

Related U.S. Application Data

(60) Provisional application No. 61/747,549, filed on Dec. 31, 2012.

(51) Int. Cl.
| | | |
|---|---|---|
| C25B 1/00 | (2006.01) | |
| C25B 9/06 | (2006.01) | |
| H01M 8/02 | (2016.01) | |
| H01M 12/08 | (2006.01) | |
| H01M 8/00 | (2016.01) | |
| H01M 12/06 | (2006.01) | |
| H01M 10/04 | (2006.01) | |

(52) U.S. Cl.
CPC ............. C25B 9/06 (2013.01); H01M 8/00 (2013.01); H01M 8/02 (2013.01); H01M 12/06 (2013.01); H01M 12/08 (2013.01); *H01M 10/04* (2013.01)

(58) Field of Classification Search
CPC ....... C25B 1/003; H01M 12/08; H01M 12/06; H01M 8/00; H01M 8/02; H01M 10/04
USPC .......................................... 204/248; 205/340
See application file for complete search history.

(56) References Cited

U.S. PATENT DOCUMENTS

| | | |
|---|---|---|
| 2005/0109391 A1 | 3/2005 | Kobayashi |
| 2007/0290287 A1 | 12/2007 | Freedman |
| 2008/0213641 A1* | 9/2008 | Ostermann ............. C25B 1/003 429/532 |

* cited by examiner

*Primary Examiner* — Zulmariam Mendez
(74) *Attorney, Agent, or Firm* — Porter, Wright, Morris & Arthur, LLP

(57) ABSTRACT

In various embodiments, an electrochemical cell is provided. The electrochemical cell may include a first electrode including a first metal oxide layer, the first layer having a first surface. The electrochemical cell may further include a second electrode including a second metal oxide layer, the second layer having a second surface, the second layer parallel to the first layer. The electrochemical cell may also include an electrolyte in direct physical contact with the first electrode and the second electrode. The first surface may be in direct physical contact to the second surface.

9 Claims, 25 Drawing Sheets

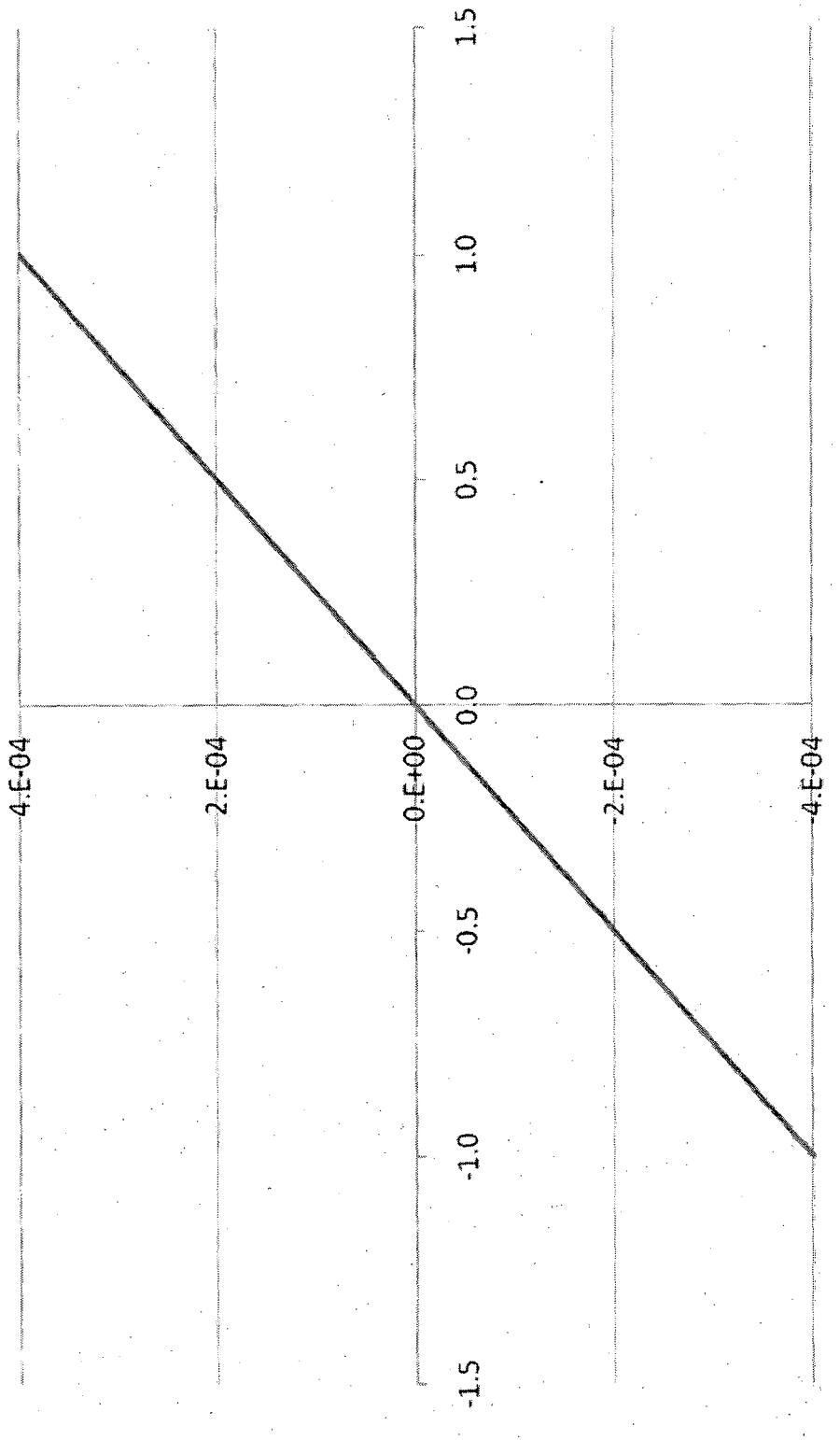

FIG. 11

1100 provide a first electrode including a first metal oxide layer, the first layer having a first surface

1102 provide a second electrode including a second metal oxide layer, the second layer having a second surface such that the second layer is parallel to the first layer and the first surface is in physical contact with the second surface

1104 physically contact the first electrode and the second electrode with an electrolyte

1106

ELECTROCHEMICAL CELL, METHOD OF FABRICATING THE SAME AND METHOD OF GENERATING CURRENT

TECHNICAL FIELD

Various aspects of this disclosure relate to electrochemical cells, methods of fabricating the same as well as methods of generating current.

BACKGROUND

Electrochemical energy conversion technologies will come to dominate many aspects of how we produce and use energy over the coming decades. This includes the conversion of fuels, such as hydrogen, methane, and alcohol, directly to electrical energy without the need of a combustion engine. It also includes the creation of useful fuels, other chemicals, and refined metals from electrical energy—processes such as electrolytic hydrogen/oxygen production, chlor-alkali, carbon sequestration, and aluminum refining.

Most of these electrochemical technologies rely on the basic structure developed over a century ago—that is an anode and cathode on opposing sides, with an electrolyte in-between. The electrolyte is most often a solid or liquid that is highly electronically insulating, but facilitates ion transfer between the anode and cathode. This design has proven relatively robust for various systems to this point due to high theoretical energy conversion efficiencies and modularity.

From a design standpoint, though, there are a numerous limitations that prevent these devices from operating to their fullest potential. The first limitation relates to the interface between the electronic conducting material, ionic conducting material, reactants, and products. In fuel cells, as an example, this is manifested in the three phase boundary region—where electron, ion, and reactant/product meet. This region often occurs at the catalyst, which is needed to facilitate the reaction. In a modern proton-exchange membrane fuel cell, only about ⅓ of the catalyst can be used for this reason, as the other ⅔ will not have access to a least one of the three necessary components. To surmount theses issues, high surface area nanocatalysts and supports have been developed along with along with composite electrode formulations incorporating additional electrolyte to extend the reaction zone—but these fixes are not ideal or very often insufficient.

The second limitation relates to mass transport of reactants and products. The reactants and products must compete in the same volume of space—one into the device and one out of the device.

SUMMARY

In various embodiments, an electrochemical cell may be provided. The electrochemical cell may include a first electrode including a first metal oxide layer, the first layer having a first surface. The electrochemical cell may further include a second electrode including a second metal oxide layer doped, the second layer having a second surface, the second layer parallel to the first layer. The electrochemical cell may also include an electrolyte in direct physical contact with the first electrode and the second electrode. The first surface may be in direct physical contact to the second surface.

In various embodiments, a method of fabricating an electrochemical cell may be provided. The method may include providing a first electrode including a first metal oxide layer, the first layer having a first surface. The method may further include providing a second electrode including a second metal oxide layer, the second layer having a second surface such that the second layer is parallel to the first layer and the first surface is in physical contact with the second surface. The method may additionally include physically contacting the first electrode and the second electrode with an electrolyte.

In various embodiments, a method of generating current may be provided. The method may include oxidizing an intermediary to form an ionic specie. The method may also include transporting the ionic specie to an electrode of a galvanic cell. The method may further include reducing the intermediary to regenerate the intermediary and to generate current.

BRIEF DESCRIPTION OF THE DRAWINGS

The invention will be better understood with reference to the detailed description when considered in conjunction with the non-limiting examples and the accompanying drawings, in which:

FIG. 2C is a graph of current (I/A) against voltage (V/V) of an electrochemical cell with a disordered arrangement of particles according to various embodiments when voltage is applied in the absence of a reactant supplied to the electrochemical cell.

FIG. 11 is a schematic showing a method of fabricating an electrochemical cell according to various embodiments.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized, and structural and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

Figure 1A:
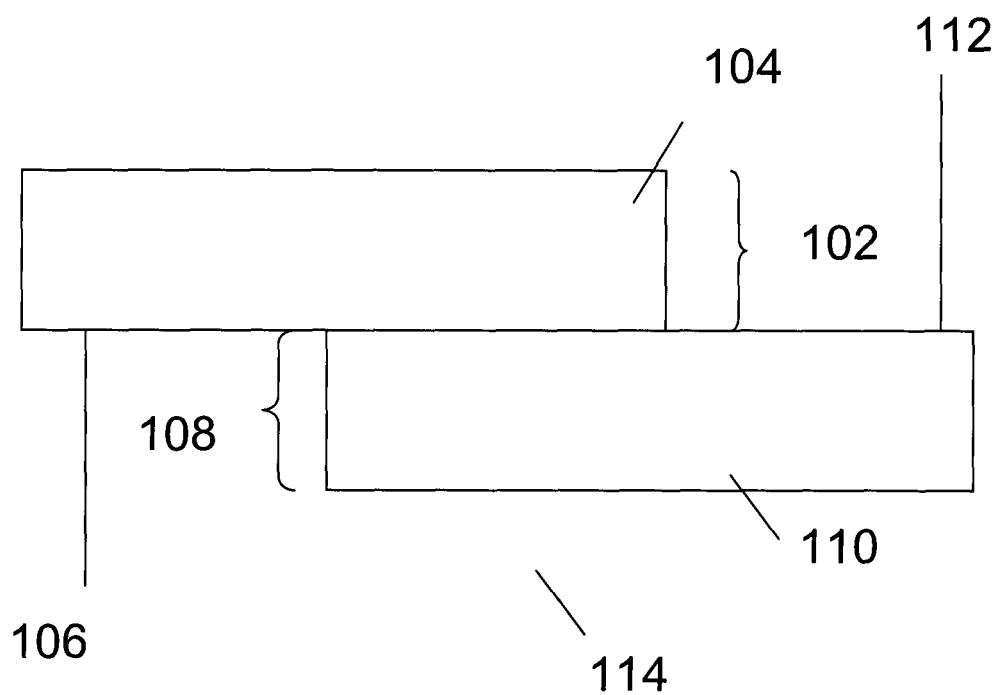
FIG. 1A shows a schematic of an electrochemical cell according to various embodiments.

FIG. 1A shows a schematic 100a of an electrochemical cell according to various embodiments. The electrochemical cell may include a first electrode 102 including a first metal oxide layer 104, the first layer having a first surface 106. The electrochemical cell may further include a second electrode 108 including a second metal oxide layer 110, the second layer having a second surface 112. The second layer 110 may be parallel to the first layer 104. The electrochemical cell may also include an electrolyte 114 in direct physical contact with the first electrode 102 and the second electrode 108. The first surface 106 may be in direct physical contact to the second surface 112.

In other words, the electrochemical cell may include a first electrode 102 and a second electrode 108. The first electrode 102 and the second electrode 108 may be arranged such that an axial length of the first electrode 102 is substantially parallel to an axial length of the second electrode 108. The first electrode 102 may include a first metal oxide. The second electrode 108 may include a second metal oxide. The first electrode 102 and the second electrode 108 may be in direct physical contact. The electrochemical cell may further include an electrolyte in direct physical contact with the first electrode 102 and the second electrode 108.

Various embodiments may increase the three phase boundary regions where electrochemical reactions can proceed. Various embodiments may lead to significant improvements in performance, cost and durability of both galvanic and electrolytic electrochemical devices. Various embodiments may remove the need for the electrolyte to function as an electronic insulator. Various embodiments may address limited performance in conventional electrochemical cells such as fuel cells by increasing the numbers of three phase boundary regions In various embodiments, the first electrode 102 may include dopants of a first conductivity type. In various embodiments, the second electrode 108 may include dopants of a second conductivity type. For instance, the first electrode 102 may be or may include a n-type semiconductor layer while the second electrode 108 may be or may include a p-type semiconductor layer. On the other hand, the first electrode 102 may be or may include a p-type semiconductor layer while the second electrode 108 may be or may include a n-type semiconductor layer. In various embodiments, the first metal oxide layer may be an intrinsic metal oxide layer. In various embodiments, the second metal oxide layer may be an intrinsic metal oxide layer.

In various alternate embodiments, the second metal oxide layer may be replaced by an electrical conductor such as a metal. The electrical conductor may be carefully designed to ensure minimal crossover. In other words, the second electrode 108 may include an electrically conducting layer such as a metal layer.

In various alternate embodiments, the first metal oxide layer and/or second metal oxide layer may be replaced or supplemented by materials such as electrical conductors (e.g. metals), insulators, catalysts, binders and supports such for separating and transferring charges (electrons and/or holes). The electrolyte 114 may be replaced or supplemented by materials for transporting for electrochemical species or ionic species. For instance, insulators may block the transfer of electrons and/or holes. Catalysts such as platinum, palladium, platinum-ruthenium alloy, etc may enhance and/or facilitate electrochemical reactions. Binders/supports may ensure structural integrity and hold the device in place. The second metal oxide layer may be replaced by a metal layer. The first metal oxide layer and the metal layer may form a schottky barrier junction.

In other words, an electrochemical cell may be provided according to various embodiments. The electrochemical cell may include a first electrode 102 and a second electrode 108. The first electrode 102 may include a first suitable material. The second electrode 108 may include a second suitable material. The first electrode 102 may be in direct physical contact with the second electrode 108. The electrochemical cell may further include an electrolyte 114. The first electrode 102 may be in direct physical contact with the electrolyte 114. The second electrode 108 may be in direct physical contact with the electrolyte 114. The first suitable material may include extrinsically doped semiconductors, intrinsic semiconductors, conductors such as metals, insulators, catalysts, binders and supports such for separating and transferring charges (electrons and/or holes). The second suitable material may include extrinsically doped semiconductors, intrinsic semiconductors, conductors such as metals, insulators, catalysts, binders and supports such for separating and transferring charges (electrons and/or holes).

For avoidance of doubt, first surface 106 in direct physical contact to the second surface 112 includes at least a portion of the first surface 106 in direct physical contact with at least a portion of the second surface 112. An electrolyte 114 in direct physical contact with the first electrode 102 may include at least a portion of the electrolyte 114 in direct physical contact with at least a portion of the first electrode 102. Similarly, an electrolyte 114 in direct physical contact with the second electrode 108 may include at least a portion of the electrolyte 114 in direct physical contact with at least a portion of the second electrode 108. A greater area of contact between the first surface 106 and the second surface 112 as well as a greater area of contact between the first electrode 102 and the electrolyte 114 and a greater area of contact between the second electrode 108 and the electrolyte 114 may mean that more particles within the electrodes 102, 108 have access to electrons/holes, ionic species (i.e. ions) and reactants/products which may improve conversion efficiency.

The electrochemical cell may be structured such that the first and second layers 104, 110 interlink with as much contact surface area as possible. This may lead to an improvement in performance as a larger surface area may translate to higher ion transfer from one side to the other side of the electrochemical cell.

Figure 1B:
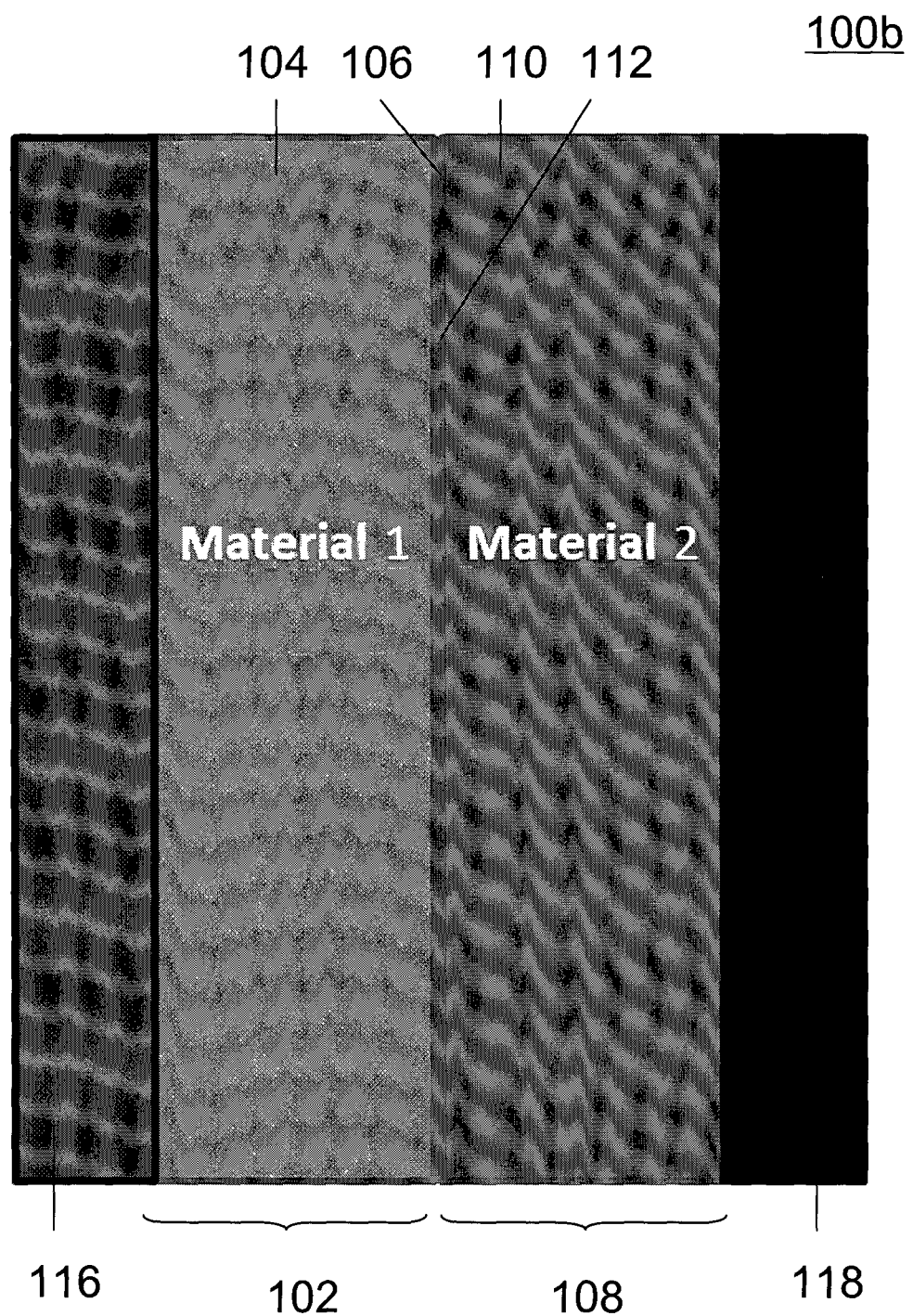
FIG. 1B shows a schematic of an electrochemical cell according to various embodiments.

FIG. 1B shows a schematic 100b of an electrochemical cell according to various embodiments.

As shown in FIG. 1B, the electrochemical cell may further include a first current collector 116 in electrical connection to the first electrode 102. The electrochemical cell may also include a second current collector 118 in electrical connection to the second electrode 108. The first current collector 116 may include a material same as the second current collector 118. Alternatively, the first current collector 116 may include, a material different from the second current collector 118. The electrolyte 114 is not shown in FIG. 1B. The first current collector 116 may include or be made of a suitable metal, a suitable conducting metal oxide/nitride, a suitable carbon allotope or any other suitable conducting materials. The second current collector 118 may include or be made of a suitable metal, a suitable conducting metal oxide/nitride, a suitable carbon allotope or any other suitable conducting materials. The first current collector 116 may be made of or may include the same material as the second current collector 118. Alternatively, the first current collector 116 may be made of or may include a material different from the second current collector 118.

In various embodiments, the axial length of the first layer 104 may be parallel to the axial length of the first current collector 116. Also, the axial length of the second layer 110 may be parallel to the axial length of the second current collector 118.

Figure 1C:
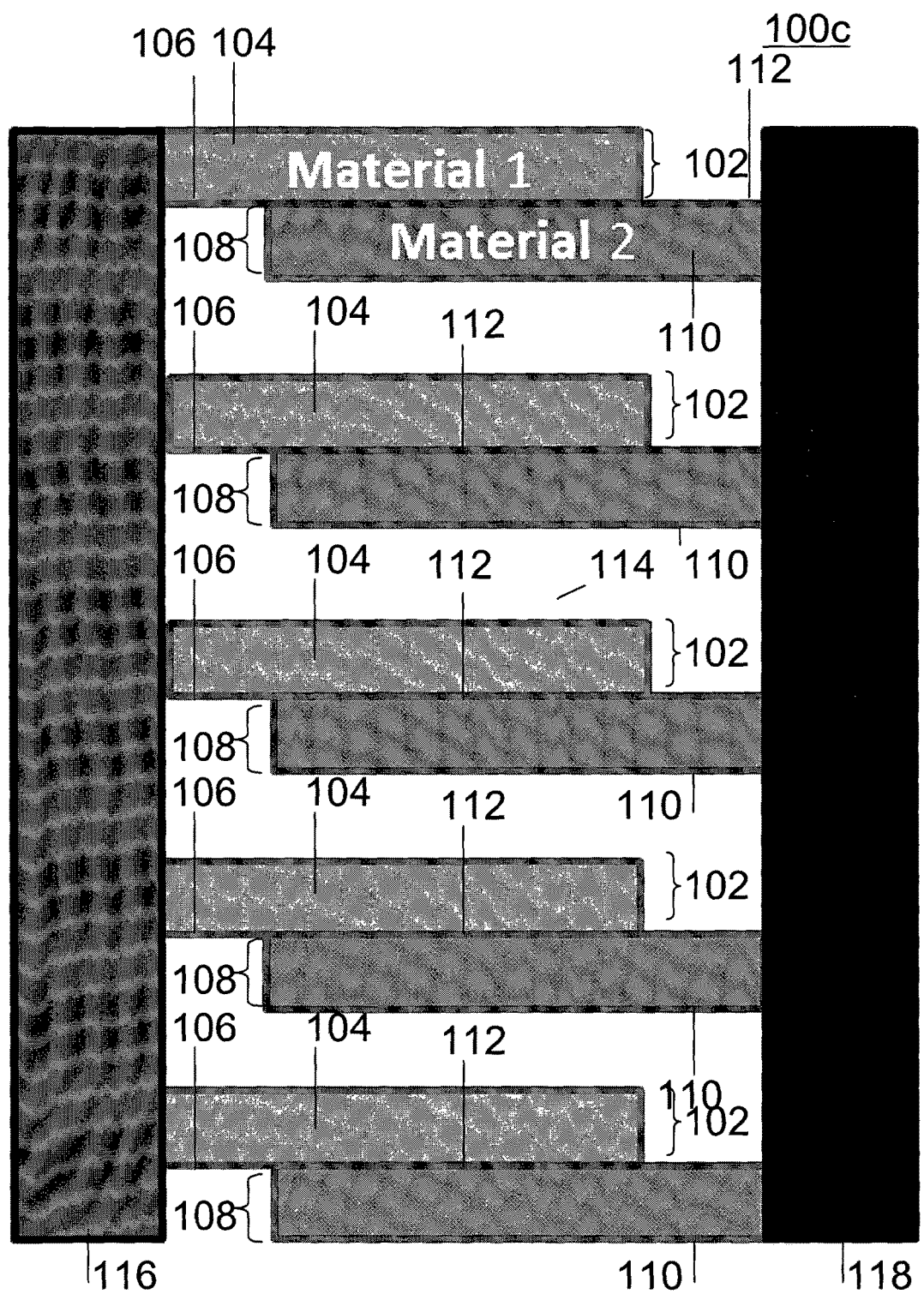
FIG. 1C shows a schematic of an electrochemical cell according to various embodiments.

FIG. 1C shows a schematic 100c of an electrochemical cell according to various embodiments. The electrochemical cell may include a plurality of first electrodes 102. The electrochemical cell may also include a plurality of second electrodes. Each first electrode 102 may include a first layer 104 having a first surface 106. Each first electrode 102 may be substantially perpendicular to the first current collector 116. Each second electrode 108 may include a second layer 110 having a second surface 112. Each second electrode 108 may be substantially perpendicular to the second current collector 118. The plurality of first electrodes 102 may be in electrical connection to the first current collector 116. The plurality of second electrodes 108 may be in electrical connection to the second current collector 118.

The first layer may be a semiconductor layer including a first semiconductor. The second layer may be a semiconductor layer including a second semiconductor. The first layer may be a single element semiconductor or a compound semiconductor layer. Further, the second layer may be a single element semiconductor layer or a compound semiconductor layer.

In various embodiments, the first semiconductor may be or may include a material same as the second semiconductor. The first surface 106 (of the first electrode 102) and the second surface 110 (of the second electrode 108) may form a homojunction. For instance, the first semiconductor and the second semiconductor may be a material such as silicon. The first semiconductor and the second semiconductor may alternatively be another semiconductor material such as germanium, gallium arsenide, zinc sulfide.

etc. The first semiconductor and the second semiconductor may be doped with different dopants. Additionally or alternatively, the first semiconductor and the second semiconductor may be doped with different concentrations of dopants. The first semiconductor and/or the second semiconductor may be instrinsic.

Alternatively, in various embodiments, the first semiconductor may be or may include a material different from the second semiconductor. For instance, the n-type semiconductor may include a material enabling formation of a n-type semiconductor such as zinc oxide (ZnO), titanium (IV) oxide ($TiO_2$), tin (IV) oxide ($SnO_2$), iron (III) oxide ($Fe_2O_3$) and nickel oxide (NiO). The p-type semiconductor may include a material enabling formation of a p-type semiconductor such as cobalt oxide (CoO), iron oxide black ($Fe_3O_4$), lithium doped nickel oxide ($Li_xNi_{1-x}O$) and copper (I) oxide ($Cu_2O$).

Alternatively, the first semiconductor may be a material such as silicon and the second semiconductor may be another material such as germanium. The first semiconductor and the second semiconductor may be doped with different dopants. The first semiconductor and the second semiconductor may be doped with different concentrations of dopants.

Figure 1D:
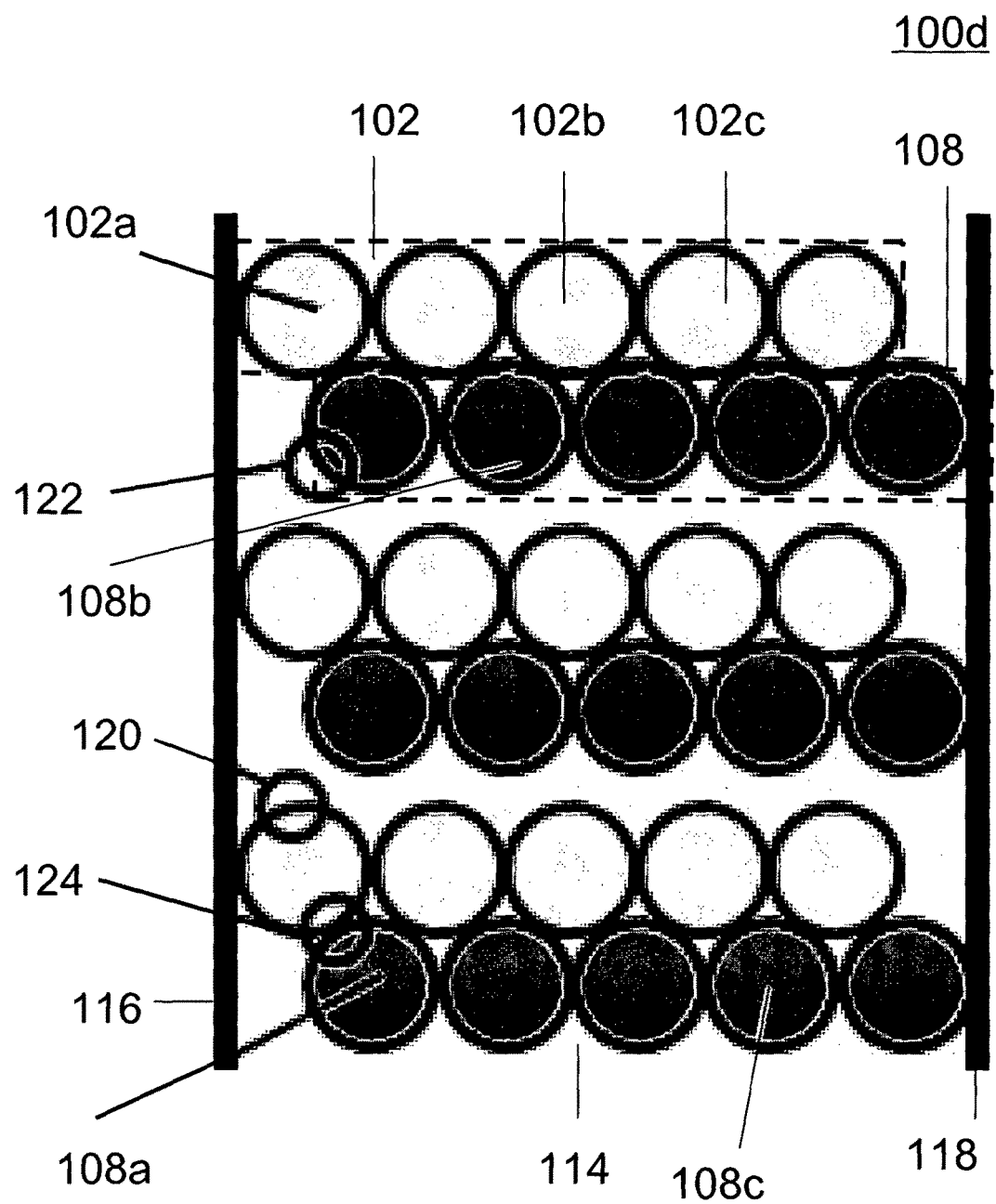
FIG. 1D shows a schematic of the particles arrangements of an electrochemical cell according to various embodiments.

FIG. 1D shows a schematic 100d of the particles arrangements of an electrochemical cell according to various embodiments.

In various embodiments, the first layer 102 may include a first ordered arrangement of first particles 102a, 102b, 102c etc. In various embodiments, the second layer 108 may include a second ordered arrangement of second particles 108a, 108b, 108c etc. In other words, the first layer 102 may include a plurality of first particles 102a, 102b, 102c etc. arranged in a regular structured array. The second layer 108 may include a plurality of second particles 108a, 108b, 108c etc. arranged in a regular structured array. The first particles 102a, 102b, 102c etc. may be arranged in a crystal lattice. The second particles 108a, 108b, 108c etc. may also be arranged in a crystal lattice. The first particles 102a, 102b, 102c etc. and/or the second particles 108a, 108b, 108c etc. may be nanostructures such as nanoparticles or atoms. In various embodiments, an ordered arrangement of particles may include a semi-ordered arrangement of particles, i.e semi-random with interconnectivity between particles. In other words, the first layer 102 may include a first semi-ordered arrangement of particles. The second layer 108 may include a second semi-ordered arrangement of particles. A semi-ordered arrangement may include particles arranged on a wire mesh. A semi-ordered arrangement may also include particles woven together (in woven materials). A semi-ordered arrangement may include a porous foam, In various embodiments, the particles may have the same shape or may have different shapes. The particles may be circular, square, hexagonal or may have any other suitable shapes. In various embodiments, the first electrode 102 and/or the second electrode 108 may include pores. The pores may include the electrolyte 114. In various embodiments, the first ordered arrangement of first particles 102a, 102b, 102c etc. may be or may include semiconductor particles and dopants. In various embodiments, the second ordered arrangement of second particles 108a, 108b, 108c etc. may be or may include semiconductor particles and dopants. The first particles 102a, 102b, 102c etc. may be or may include the first metal oxide particles. The second particles 108a, 108b, 108c etc. may be or may include second metal oxide particles.

As the first electrode 102 is in direct physical contact with the electrolyte 114, one or more first particles (e.g. 102b) may form a first interface 120 with the electrolyte 114. The interface 120 may be an ohmic contact (also known as ohmic junction) or a rectifying contact (also known as rectifying junction or schottky barrier junction). In other words, the first electrode 102 may form an ohmic junction or a schottky barrier junction with the electrolyte 114. Also, as the second electrode 108 is in direct physical contact with the electrolyte 114, one or more second particles (e.g. 108b) may form a second interface 122 with the electrolyte 114. The interface 122 may be an ohmic contact (or ohmic junction) or a rectifying contact (or rectifying junction or schottky barrier junction). In other words, the second electrode 108 may form an ohmic junction or a schottky barrier junction with the electrolyte. Further, as the first surface 106 (of the first electrode 102) is in direct physical contact with the second surface 112 (of the second electrode 108), one or more first particles (e.g. 102b) may form a third interface 124 with one or more second particles (e.g. 108b). The first particles 102a may be the same as the second particles 108a or may be different. A plurality of heterojunctions/homojunctions may exist between the first particles 102a 102b, 102c etc. and second particles 108a, 108b, 108c etc.

In various embodiments, the first layer 104 may include a single layer of first particles 102a 102b, 102c etc. In various embodiments, the second layer 110 may include a single layer of second particles 108a, 108b, 108c etc. The single first layer 104 of first particles may be directly in contact with the single second layer 110 of second particles. The single first layer 104 may be parallel to the single second layer 110. Advantageously, having a single layer of first particles allows each first particle to form the first interface 120 with the electrolyte 114 and to form the third interface 124 with the second particles. Similarly, having a single layer of second particles 108a allows each second particle to form the second interface 122 with the electrolyte 114 and to form the third interface 124 with the first particles. By having a monolayer of first particles on a monolayer of second particles, each first particle 102a and each second particle may have access to a three phase boundary region. Consequently, conversion efficiencies may be improved.

An electric field may be setup between each and every interface each particle 102a, 108a has with its surroundings (i.e. electrolyte 144, semiconductor particles or metal particles). Examples of energy band diagrams of these interfaces 120, 122 and 124 will be shown later for illustration purposes. The availability of the first interface, the second interface and/or the third interface may be balanced so as not to compete with one another and limit the reaction rate. The first interface 120 may facilitate the electron or hole transfer of the negative of the two primary redox couples (compared against the standard hydrogen electrode (SHE)). The second interface 122 may facilitate the electron or hole of the more positive of the two primary redox reaction couples (compared against the standard hydrogen electrode (SHE)). The third interface 124 may set up a depletion region that ensures charge (i.e. electrons and/or holes) separation.

In various embodiments, the electrochemical cell may be a galvanic cell. The electrochemical cell may further include a load having a first end and a second end. The first end of the load may be in electrical connection to the first layer 104. The second end of the load may be in electrical connection to the second layer 110. The galvanic cell may convert chemical potential energy into electrical energy. In other words, the galvanic cell may generate a current based on redox reactions occurring at the first electrode 102 and the second electrode 108. For instance, in a fuel cell, fuel may be oxidized at the anode and the oxidant may be reduced at the cathode. The electrons and/or holes may be generated at the anode and cathode due to the reactions occurring the anode and cathode.

In various embodiments, the electrochemical cell may be an electrolytic cell. The electrochemical cell may further include a voltage source having a first end and a second end. The first end of the voltage source may be in electrical connection to the first layer 104. The second end of the voltage source may be in electrical connection to the second layer 110. The electrolytic cell may convert electrical energy into chemical potential energy. In other words, the electrolytic cell may cause redox reactions to occur at the first electrode 102 and the second electrode 108. by driving a current through the electrolytic cell. The application of a voltage across an electrolytic cell may generate electrons and/or holes in the semiconductors, e.g. in the depletion regions. The electrons and/or holes may travel to the first interface 120 of the first electrode 102 with the electrolyte 114 and the second interface 122 of the second electrode 108 with the electrolyte and cause reactions to occur.

In various embodiments, a depletion region including at the first surface 106 and the second surface 112 may be formed during operation. A depletion region may be formed at least a portion of the first surface 106 and at least a portion of the second surface 112. In the case in which the second electrode 108 is a conductor such as a metal, the depletion region may be formed (only) on the first surface 106 of the first electrode 102.

The depletion region may be configured to reduce movement of electrons through a junction between the first surface 106 and the second surface 112.

In various embodiments, the first electrode 102 may be configured to generate a first ionic specie (ions). The second electrode 108 may be configured to consume a second ionic specie.

The ionic species (ions) may be transported to and/or away from the first and/or second electrodes 102, 108 by the electrolyte 114. In various embodiments, the electrolyte 114 may be configured to transport the first ionic specie (generated by the first electrode 102) away from the first electrode 102. The electrolyte may be configured to transport the second ionic specie to the second electrode 108 (to be consumed).

In various embodiments, the second ionic specie (ions) may be generated by oxidizing an intermediary in a location away from the electrochemical cell. The second ionic specie (ions) may be generated by oxidizing an intermediary in a location away or remote from or outside the electrochemical cell. The second ionic specie may be transported to an electrode, for instance the second electrode 108 of the electrochemical cell.

In various alternate embodiments, the first electrode 102 may be configured to consume a first ionic specie (ions). The second electrode 108 may be configured to generate a second ionic specie (ions). The electrolyte 114 may be configured to transport the first ionic specie to the first electrode 102 (to be consumed). The electrolyte may be configured to transport the second ionic specie (generated by the first electrode 102) away from the second electrode 108.

In various embodiments, the electrolyte 114 may be or may include an aqueous solution. The electrolyte 114 may include an alkaline solution. Various embodiments may use alkaline ion transfer.

Figure 1E:
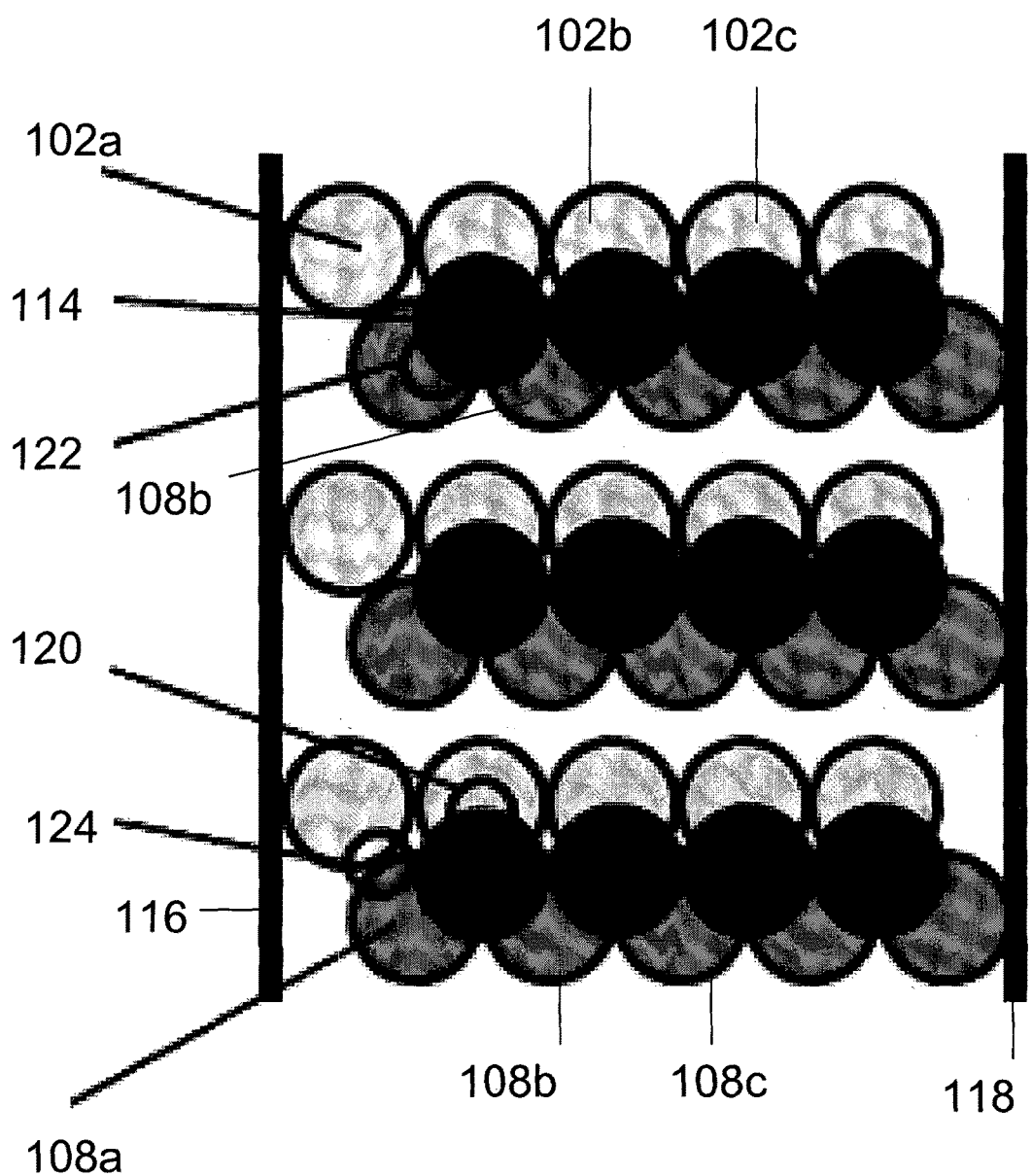
FIG. 1E shows a schematic of an electrochemical cell according to various embodiments in which the electrolyte is a solid or a semi-solid.

In various alternate embodiments, the electrolyte 114 may be an ionic conductor. The electrolyte may be or may include a solid or a semi-solid such as a gel. The electrolyte may include a polymer or any material capable of transporting ionic species. FIG. 1E shows a schematic 100e of an electrochemical cell according to various embodiments in which the electrolyte 114 is a solid or a semi-solid. Advantageously, solid or semi-solid electrolytes may be more robust than aqueous electrolytes.

Various embodiments may not include an electrolyte. In other words, the electrochemical cell may only include the first electrode 102 and the second electrode 104 and optionally the current collectors as well as the external circuit (load or voltage source). Instead the first electrode 102 and the second electrode 104 may be capable of bulk and/or surface electrochemical species transfer. The ionic species and the reactants and/or products may be transported through the first electrode 102 and the second electrode 104.

In various embodiments, the electrochemical cell may be or may include a membrane.

Figure 2A:
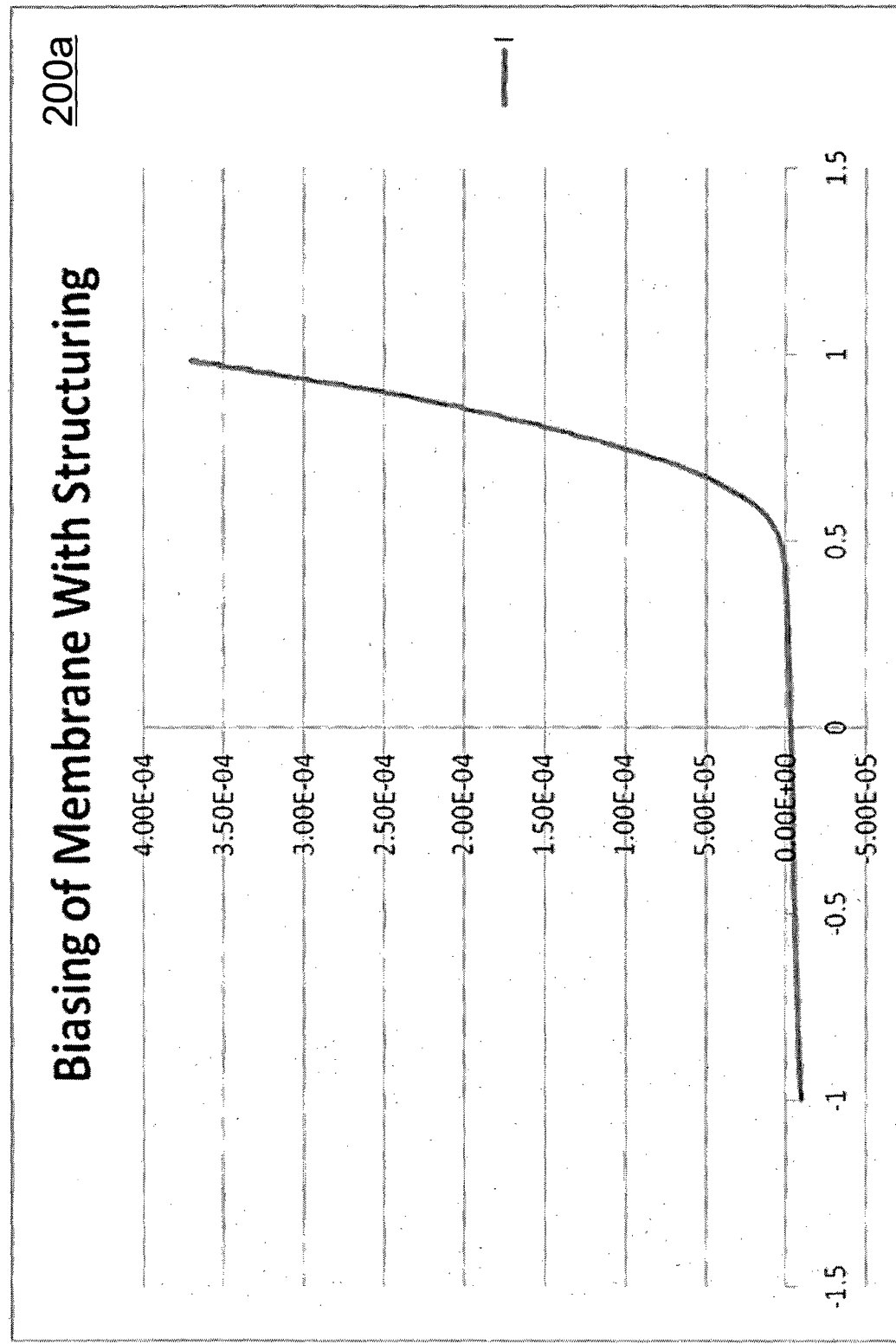
FIG. 2A is a graph of current (I/A) against voltage (V/V) of an electrochemical cell with an ordered arrangement of particles according to various embodiments when voltage is applied in the absence of a reactant supplied to the electrochemical cell.

FIG. 2A is a graph 200a of current (I/A) against voltage (V/V) of an electrochemical cell with an ordered arrangement of particles according to various embodiments when voltage is applied in the absence of a reactant supplied to the electrochemical cell. The electrochemical cell having the current-voltage characteristics as shown in FIG. 2A may be the electrochemical cell shown in any of FIGS. 1A-1E.

Figure 2B:
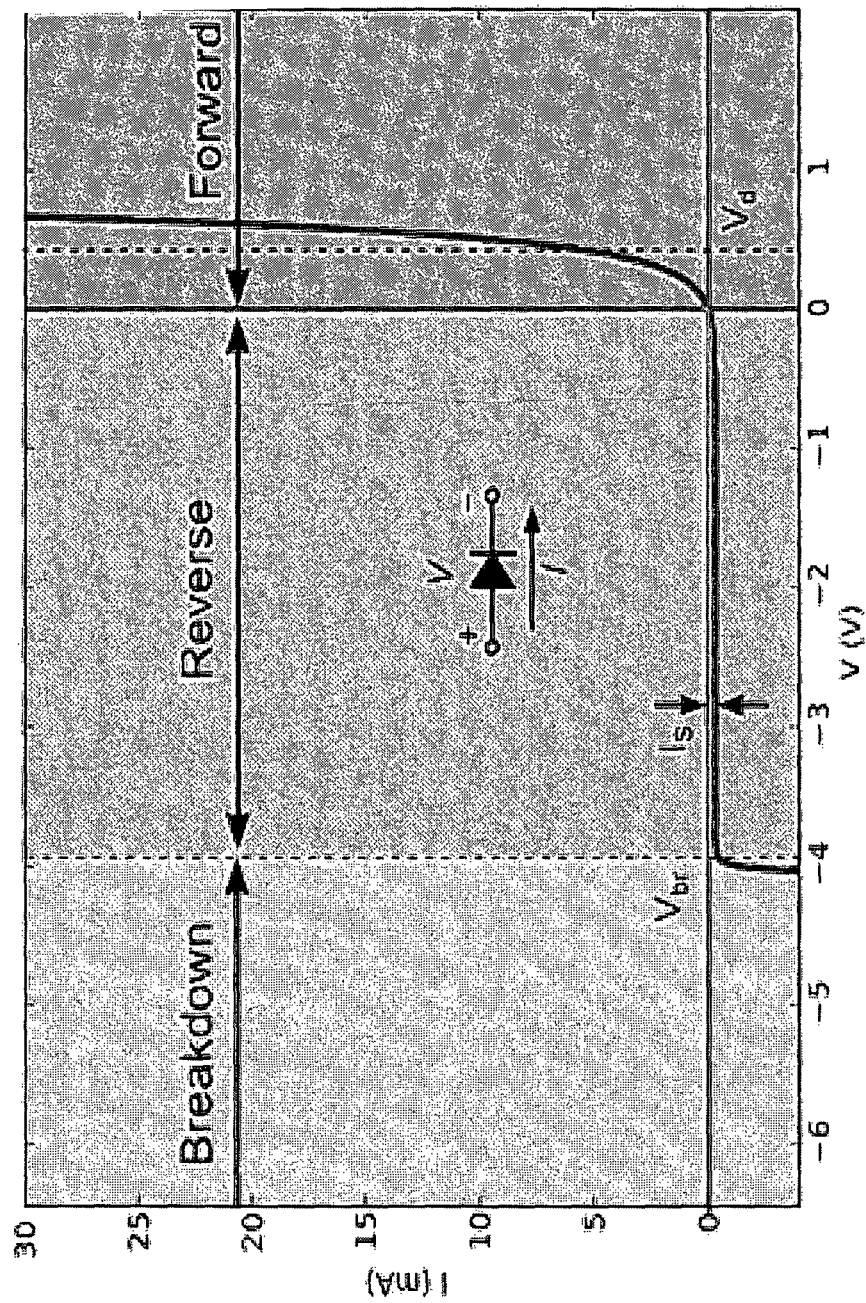
FIG. 2B is a graph of current (I/mA) against voltage (V/V) of a diode.

FIG. 2B is a graph 200b of current (I/mA) against voltage (V/V) of a diode. The current-voltage (IV) characteristics of the electrochemical cell as illustrated in FIG. 2A resembles the IV characteristics of the diode as shown in FIG. 2B, indicating the presence of a depletion region in the electrochemical cell during operation. The presence of the depletion region allows the electrochemical cell to work.

As with a diode, a depletion region may be set up within the heterojunctions (different materials with different bandgaps) or homojunctions (same band gap, different doping levels, i.e. silicon). These regions may be set up like a normal p-n junction diode or with mixed conductors/semiconductors like a Schottky diode. The depletion region may also called a reverse bias region.

An usable voltage may be produced in the depletion region (for a galvanic device) or an usable voltage may applied be applied to the depletion region (for an electrolytic device). In this manner, no current (or extremely little) will be allowed to "leak" across the electrochemical device (e.g. a membrane) to the other side and instead will go through the external wiring and circuit, which is desired. Thus the charge separation aspect of the electrochemical device (e.g. the membrane) is successfully achieved.

In contrast, FIG. 2C is a graph 200c of current (I/A) against voltage (V/V) of an electrochemical cell with a disordered arrangement of particles according to various embodiments when voltage is applied in the absence of a reactant supplied to the electrochemical cell. FIG. 2C illustrates that the disordered arrangement of particles has a ohmic or dominant resistor behaviour. An electrochemical cell where functional components (i.e. p-type semiconductors, n-type semiconductors, insulators, conductors) are mixed without a specific ordering or structuring may show this mostly dominant resistor behavior as shown in FIG. 2C. This may be tested when the device is not being fed any reactants and is simply biased with a range of voltages. In this case Ohm's law will be followed: I=V/R. Most often it will not show perfectly linear behavior though, as "real world" materials usually show some non-linear behavior.

Such electrochemical cells may require a third component (such as Sm-doped $CeO_2$ or yttria-stabilized zirconia (YSZ)) that becomes n-type under reducing (electron-donating) conditions and p-type under oxidizing (electron-accepting) conditions to operate. Such electrochemical cells may require high temperatures >300° C.

Figure 3A:
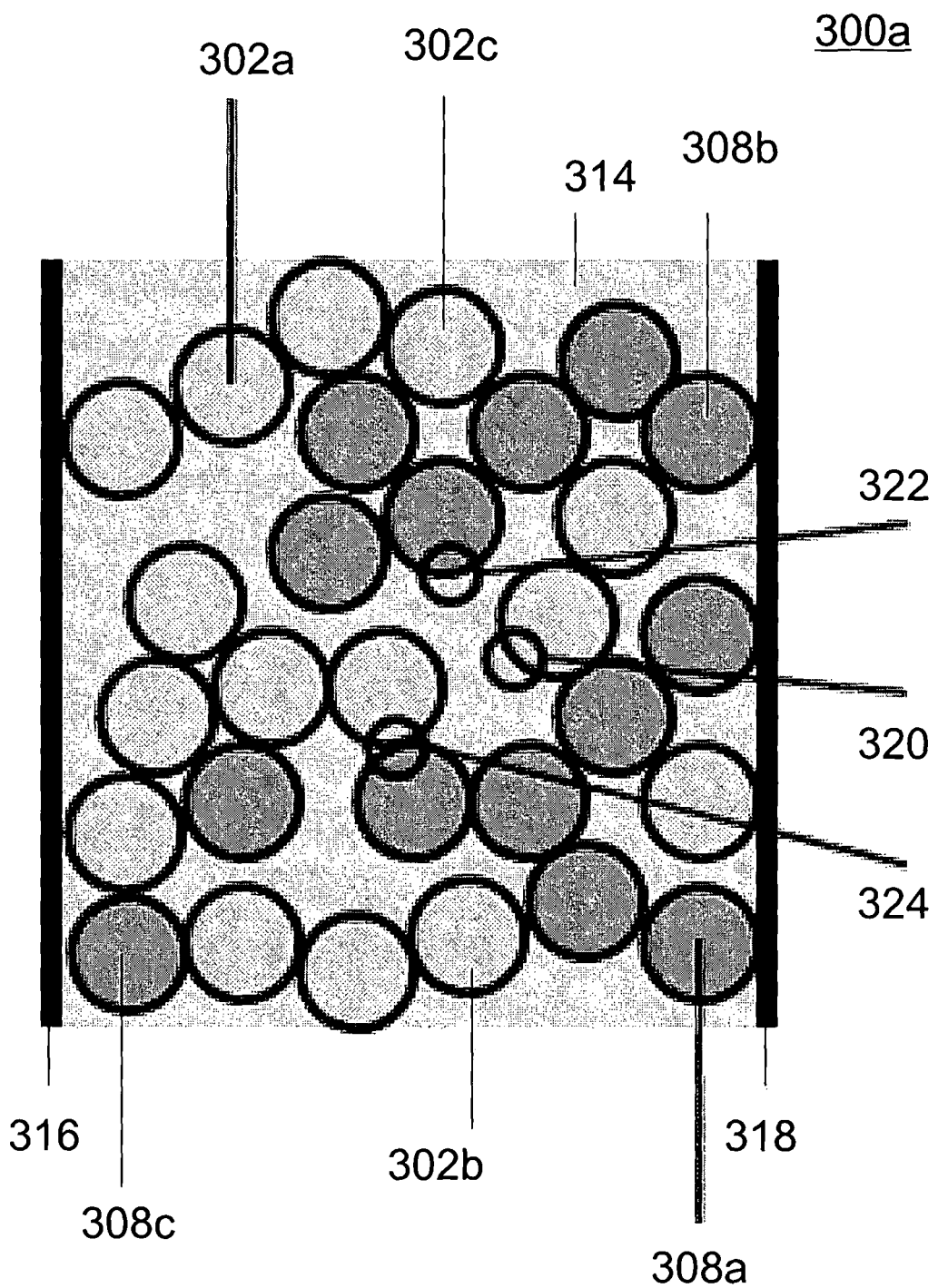
FIG. 3A shows a schematic of an electrochemical cell according to various embodiments.

FIG. 3A shows a schematic 300a of an electrochemical cell according to various embodiments. The electrode may have a semi-ordered arrangement of particles. The electrochemical cell may include a first electrode including a first particle 302a. The electrochemical cell may further include a second electrode including a second particle 308a. The first particle 302a may be in direct physical contact with an electrolyte 314. The second particles 308a may be in direct physical contact with the electrolyte 314. The first particle 302a may be in direct physical contact with the second particles 308a.

The first electrode may further include one or more further first particles 302b. 302c etc. The second electrode may further include one or more further second particles 308b, 308c. The first particles 302a, 302b, 302c etc may form a semi-ordered arrangement. In other words, the first electrode may be or may include a semi-ordered arrangement of first particles. The first particles 302a, 302b, 302c etc may be in electrical connection with one another and with the first current collector 316. The semiconductor second particles 308a, 308b, 308c may be or may include a semi-ordered arrangement of second particles. The second particles 308a, 308b, 308c may be in electrical connection with one another and with the second current collector 318. The first particles 302a, 302b. 302c etc. may be or may include semiconductor particles. The second particles 308a, 308b, 308c etc may be or may include semiconductor particles. The first electrode may be doped with dopants of a first conductivity type. The second electrode may be doped with dopants of a second conductivity type. A semi-ordered arrangement may include particles arranged on a wire mesh. A semi-ordered arrangement may also include particles woven together (in woven materials). A semi-ordered arrangement may include a porous foam, In various embodiments, the particles may have the same shape or may have different shapes. The particles may be circular, square, hexagonal or may have any other suitable shapes. In various embodiments, the first electrode and/or the second electrode may include pores. The pores may include the electrolyte 314. The first particles 302a, 302b. 302c etc. may be or may include the first metal oxide particles. The second particles. 308a, 308b, 308c etc may be or may include the second metal oxide particles.

A semi-ordered arrangement of particles may have a current-voltage characteristic similar to that shown in FIG. 2A. In contrast, a disordered arrangement of particles may have a current voltage characteristic similar to that shown in FIG. 2C. In other words, the electrochemical cell in FIG. 3A would also show a current-voltage characteristics similar to that shown in FIG. 2A.

One or more first particles 302a, 302b, 302c etc may be in direct physical contact with one or more second particles 308a, 308b, 308c etc. One or more first particles 302a, 302b, 302c etc may be in direct physical contact with the electrolyte 314. One or more second particles 308a, 308b, 308c etc. may be in direct physical contact with the electrolyte 314.

The greater the number of first particles 302a, 302b, 302c are in direct physical contact with the second semiconductors 308a, 308b, 308c and the electrolyte 314, the greater the access of the first particles 302a, 302b, 302c to three phase regions and the higher the conversion efficiency. Similarly, the greater the number of second particles 308a, 308b, 308c are in direct physical contact with the first semiconductors 302a, 302b, 302c and the electrolyte 314, the greater the access of the second particles 308a, 308b, 308c to three phase regions and the higher the conversion efficiency.

The electrochemical cell may further include the first current collector 316 and the second current collector 318. The first particles 302a, 302b, 302c may be directly in electrical contact with the first current collector 316 or may be indirectly in electrical contact with the first current collector 316 via other semiconductor first particles. Similarly, the second particles 308a, 308b, 308c may be directly in electrical contact with the second current collector 318 or may be indirectly in electrical contact with the second current collector 318 via other second particles.

Figure 3B:
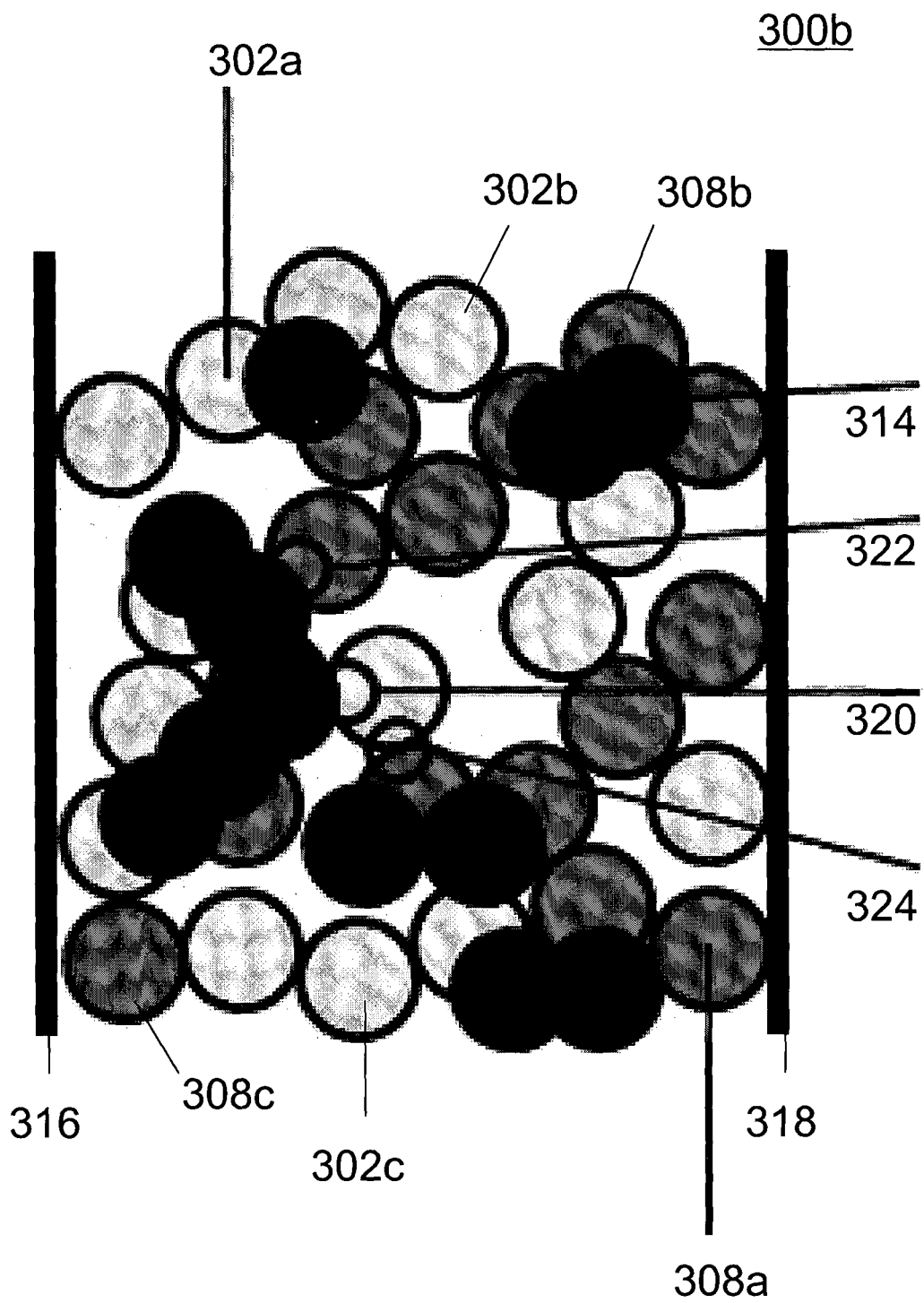
FIG. 3B shows a schematic of an electrochemical cell according to various embodiments in which the electrolyte is a solid or a semi-solid.

FIG. 3B shows a schematic 300b of an electrochemical cell according to various embodiments in which the electrolyte 314 is a solid or a semi-solid. The first particles 302a, 302b, 302c etc may form a semi-ordered arrangement. The semiconductor second particles 308a, 308b, 308c may be or may include a semi-ordered arrangement of second particles. In other words, the electrochemical cell in FIG. 3B would also show a current-voltage characteristics similar to that shown in FIG. 2A.

FIGS. 1A-E and FIGS. 3A-B are some examples illustrating the physical design of the active device according to various embodiments. The scale and proportions of the components relative to one another are not too important and are not meant to be taken concretely. In other words, the scale and proportions are shown for illustration purposes only and the actual scale and proportions may differ from that shown in the figures. The actual dimensions may vary depending on material preparation methods and a significant number of other factors. Various embodiments may replace a membrane electrode assembly (MEA). The electrochemical cell may be of similar dimensions and characteristics of the MEA. Operating requirements and conditions may dictate or influence the design of the electrochemical cell. The electrochemical cell may be operated in a manner similar to a MEA.

The first and/or the second current collectors may be a gas/liquid diffusion layer in combination with a bipolar flow plate. Electrons and holes may recombine in the current collectors. The current collectors may connect to the load or power supply as in existing systems.

The electrochemical cell may also include further redox potentials in addition to the two primary redox potentials described herein. More redox potentials may be accessible depending on the exact system. The electrochemical cell may be or may include fuel cells, batteries, metal extraction cells, electrochemical fuel synthesis cells etc.

Figure 4A:
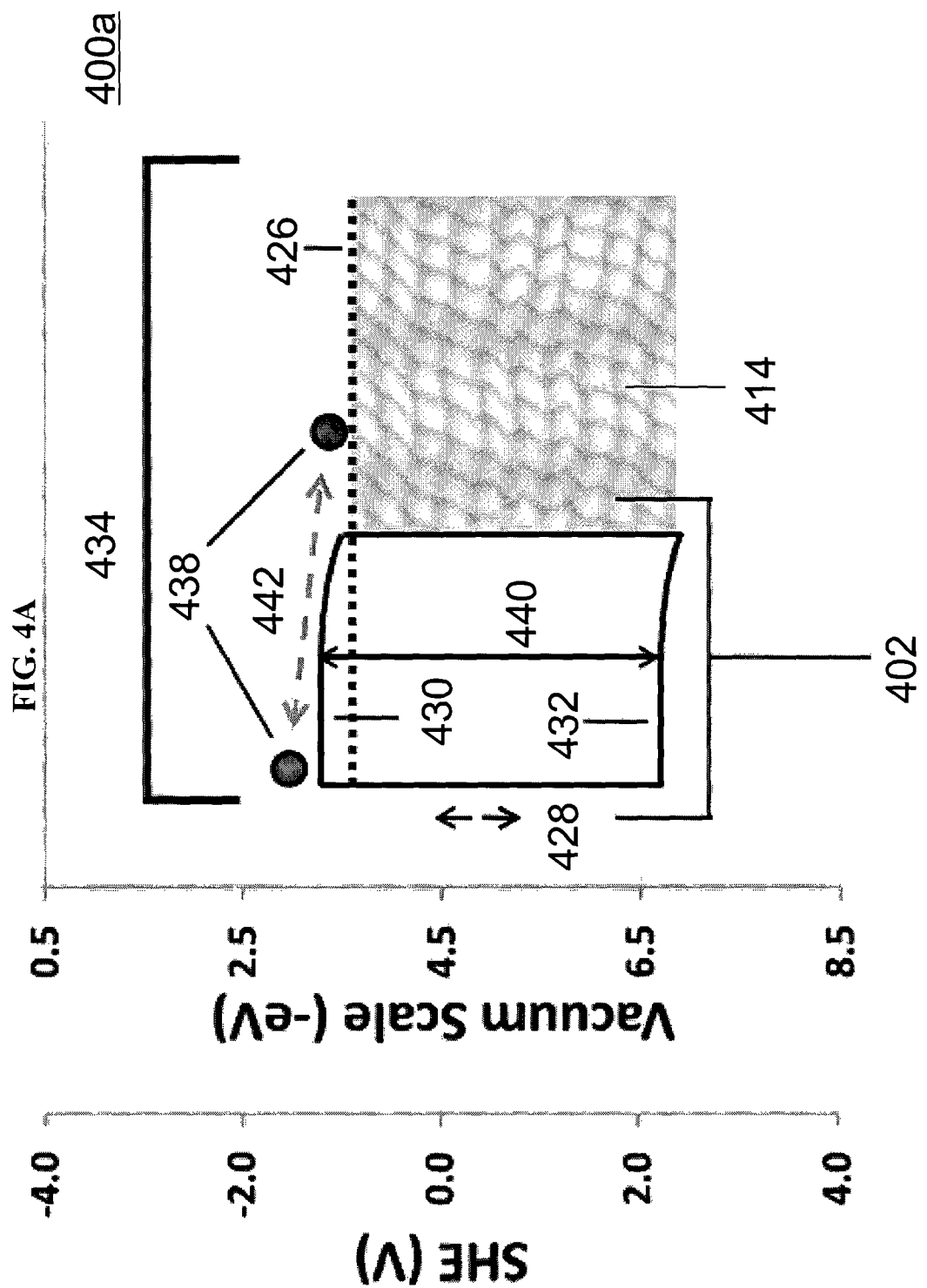
FIG. 4A shows a schematic of an energy band diagram of an ohmic contact of an electrode with an electrolyte.
Figure 4B:
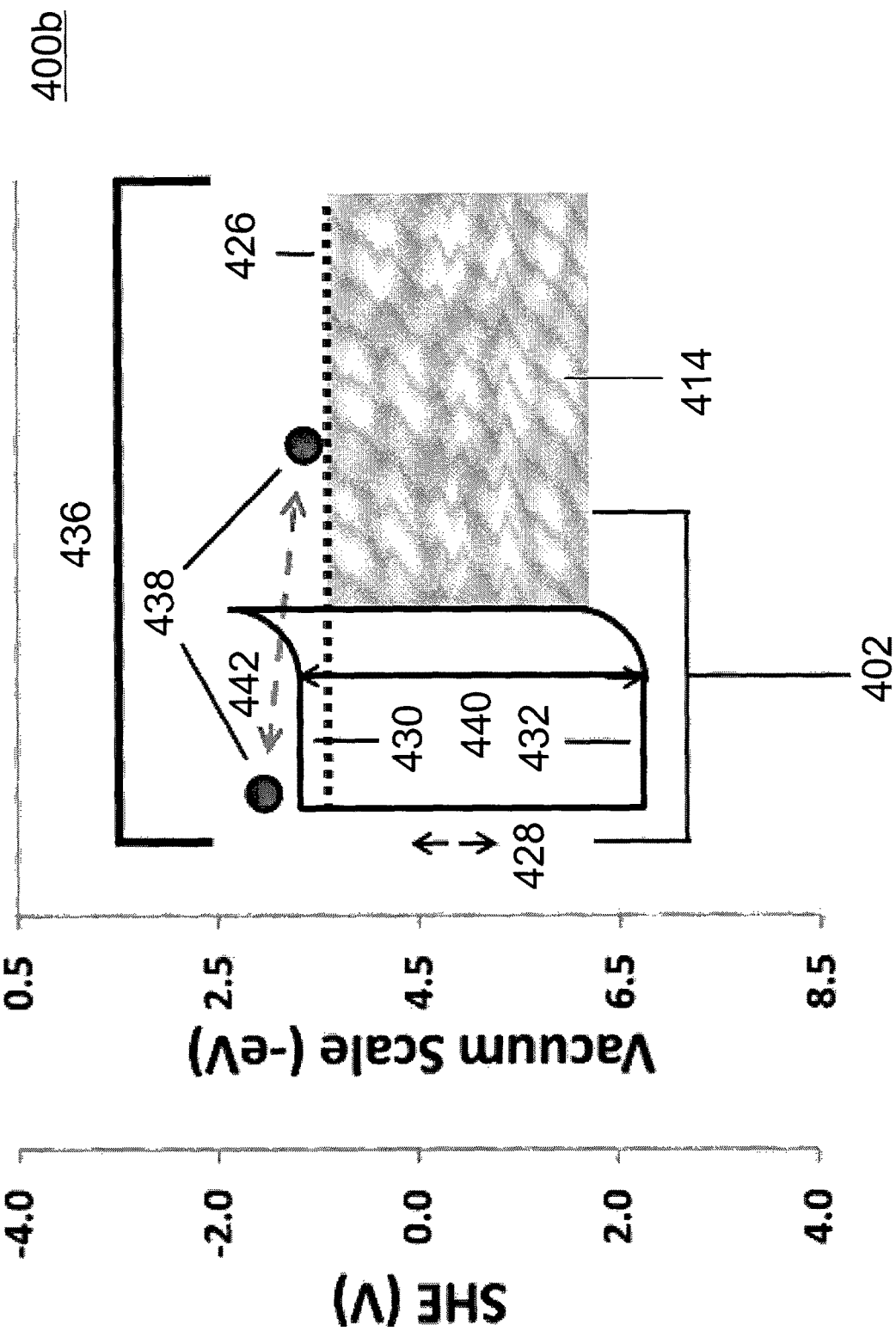
FIG. 4B shows a schematic of an energy band diagram of a schottky contact of an electrode with an electrolyte.

FIG. 4A shows a schematic 400a of an energy band diagram of an ohmic contact 434 of an electrode 402 with an electrolyte 414. FIG. 4B shows a schematic 400b of an energy band diagram of a schottky contact 436 of an electrode 402 with an electrolyte 414. The electrode 402 may be a semiconductor electrode. The work function of the semiconductor may reaches equilibrium 426 with the redox potential(s) of the electrochemical species in the electrolyte the semiconductor is in contact with. This may result in an electric field near the interface, causing band shifting/bending 428 of the conduction band 430 as well as the valence band 432 of the semiconductor, with the field's parameters being functions of the entire system's other parameters. Depending on the conduction band 430 and work function positions relative to vacuum (and standard hydrogen electrode (SHE)), either an ohmic contact 434 (shown in FIG. 4A) or rectifying/schottky contact 436 (shown in FIG. 4B) may be formed with the electrolyte 414. The electrodes 402 in FIGS. 4A and/or 4B may be the anode of a galvanic device using electrons 438 as primary charge carriers or the cathode in an electrolytic device using electrons 438 as, primary charge carriers. For a reaction in the galvanic device such as a fuel cell, an electron 438 may be generated by the electrochemical species of the electrolyte 414 undergoing oxidation. The electron 438 may move from the interface to the semiconductor's conduction band 430. For an electrolytic device such as an electroanalyzer, an electron 438 may move from the semiconductor's conduction band 430 to the interface and the electrochemical species undergoes reduction and absorbs the electron 438. 440 indicates the bandgap of the semiconductor. Arrows 442 illustrates the bidirectional nature of electrons 438 from the conduction band 430 to and from the electrolyte 414.

Figure 5A:
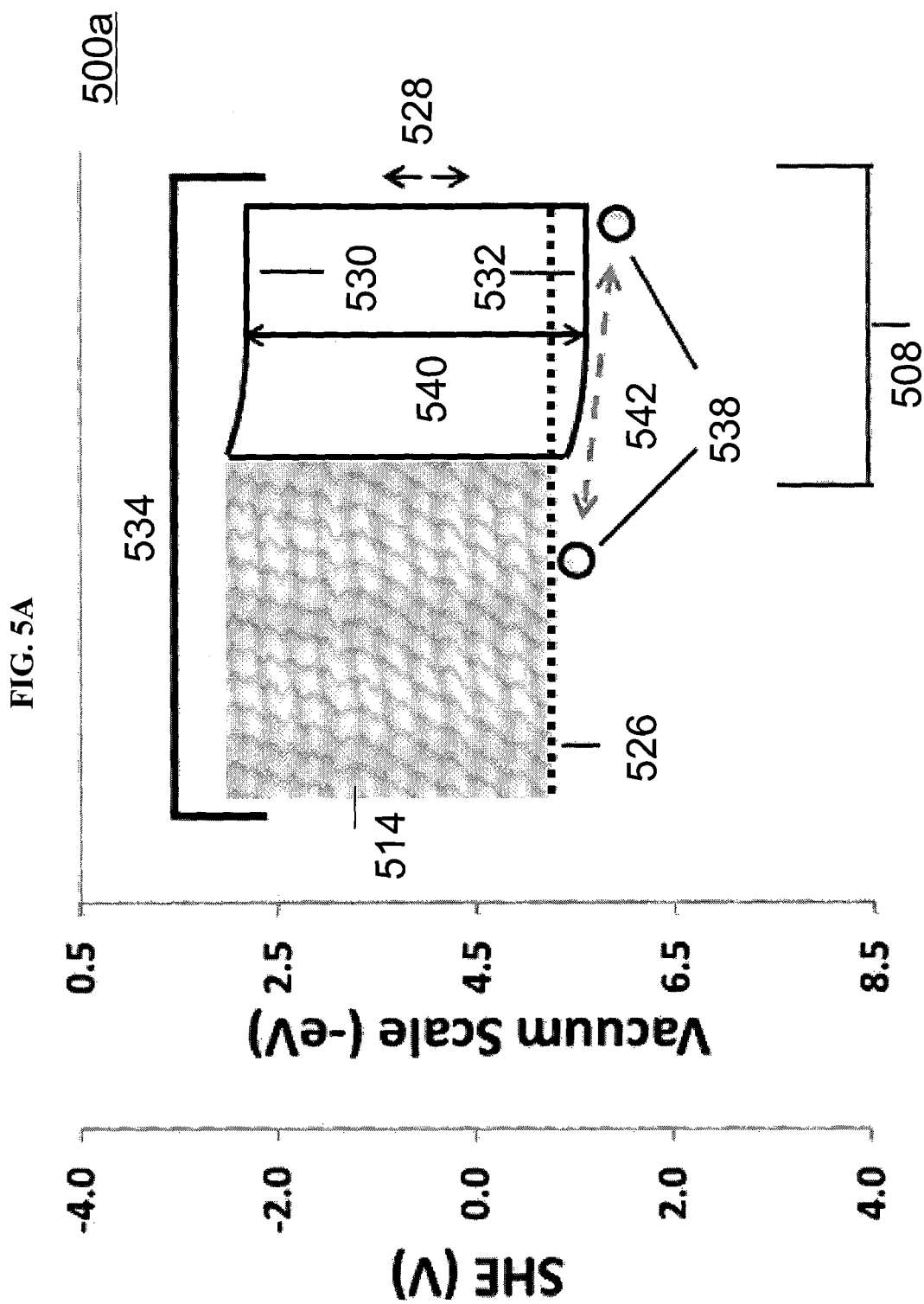
FIG. 5A shows a schematic of an energy band diagram of an ohmic contact of an electrode with an electrolyte.
Figure 5B:
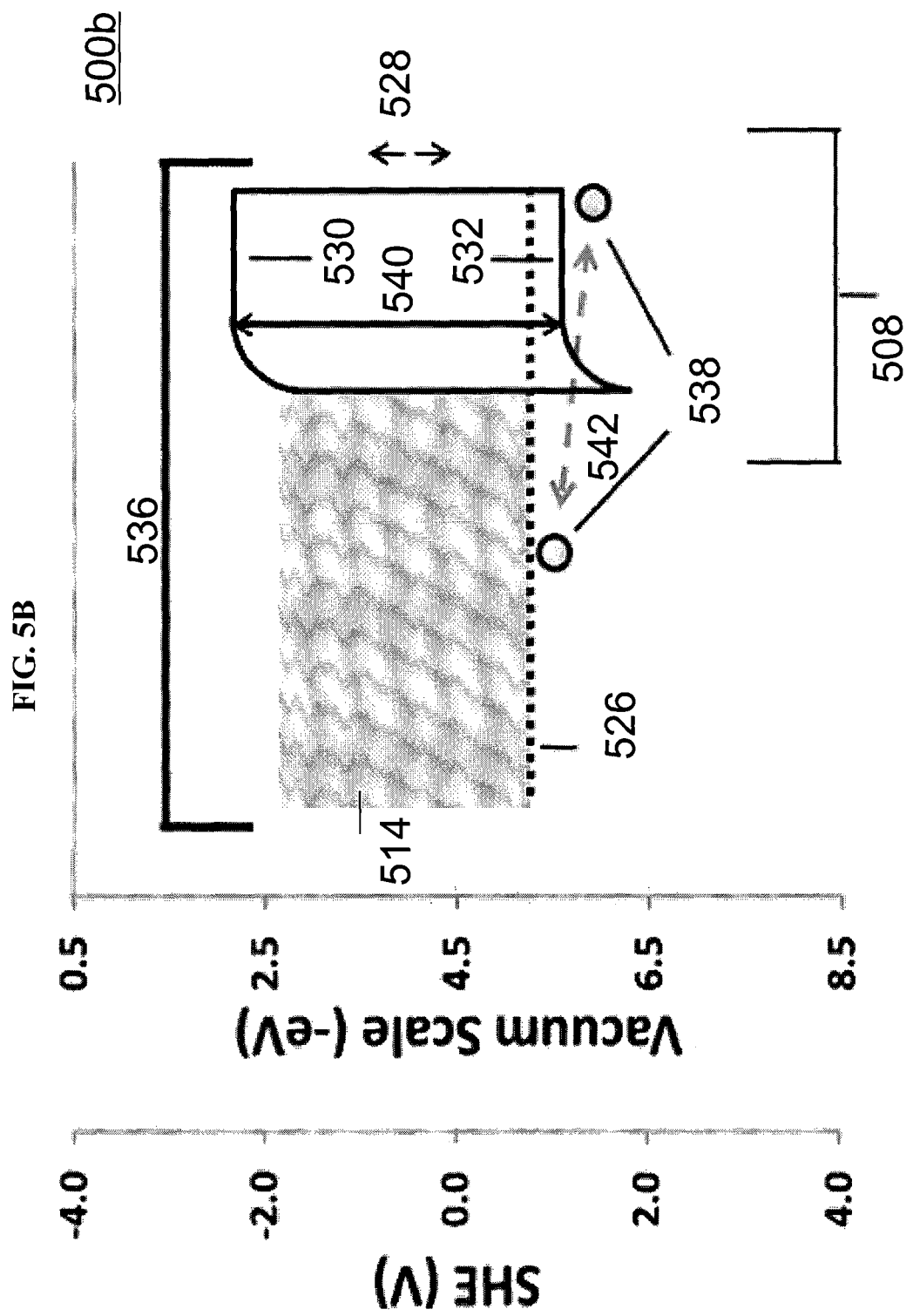
FIG. 5B shows a schematic of an energy band diagram of a schottky contact of an electrode with an electrolyte.

FIG. 5A shows a schematic 500a of an energy band diagram of an ohmic contact 534 of an electrode 508 with an electrolyte 514. FIG. 5B shows a schematic 500b of an energy band diagram of a schottky contact 536 of an electrode 508 with an electrolyte 514. The electrode 508 may be a semiconductor electrode. The work function of the semiconductor may reaches equilibrium 526 with the redox potential(s) of the electrochemical species in the electrolyte 514 the semiconductor is in contact with. This may result in an electric field near the interface, causing band shifting/bending 528 of the conduction band 530 as well as the valence band 532 of the semiconductor, with the field's parameters being functions of the entire system's other parameters. Depending on the valence band 532 and work function positions relative to vacuum (and standard hydrogen electrode (SHE)), either an ohmic contact 534 (shown in FIG. 5A) or rectifying/schottky contact 536 (shown in FIG. 5B) may be formed with the electrolyte 514. The electrode 508 in FIGS. 5A and/or 5B may be the cathode in a galvanic device using holes 538 as primary charge carriers or the anode in an electrolytic device using holes 538 as primary charge carriers. For a reaction in the galvanic device, holes 538 are generated by the electrochemical species in the electrolyte 514 undergoing reduction and the generated holes 538 may move from the interface to the valence band 532 of the semiconductor. For a reaction in the electrolytic device, holes 538 may move from the valence band 532 of the semiconductor to the interface to be absorbed by the electrochemical species in the electrolyte 514 undergoing oxidation. 540 indicates the bandgap of the semiconductor. Arrows 542 illustrates the bidirectional nature of holes 538 from the conduction band 530 to and from the electrolyte 514.

Figure 6A:
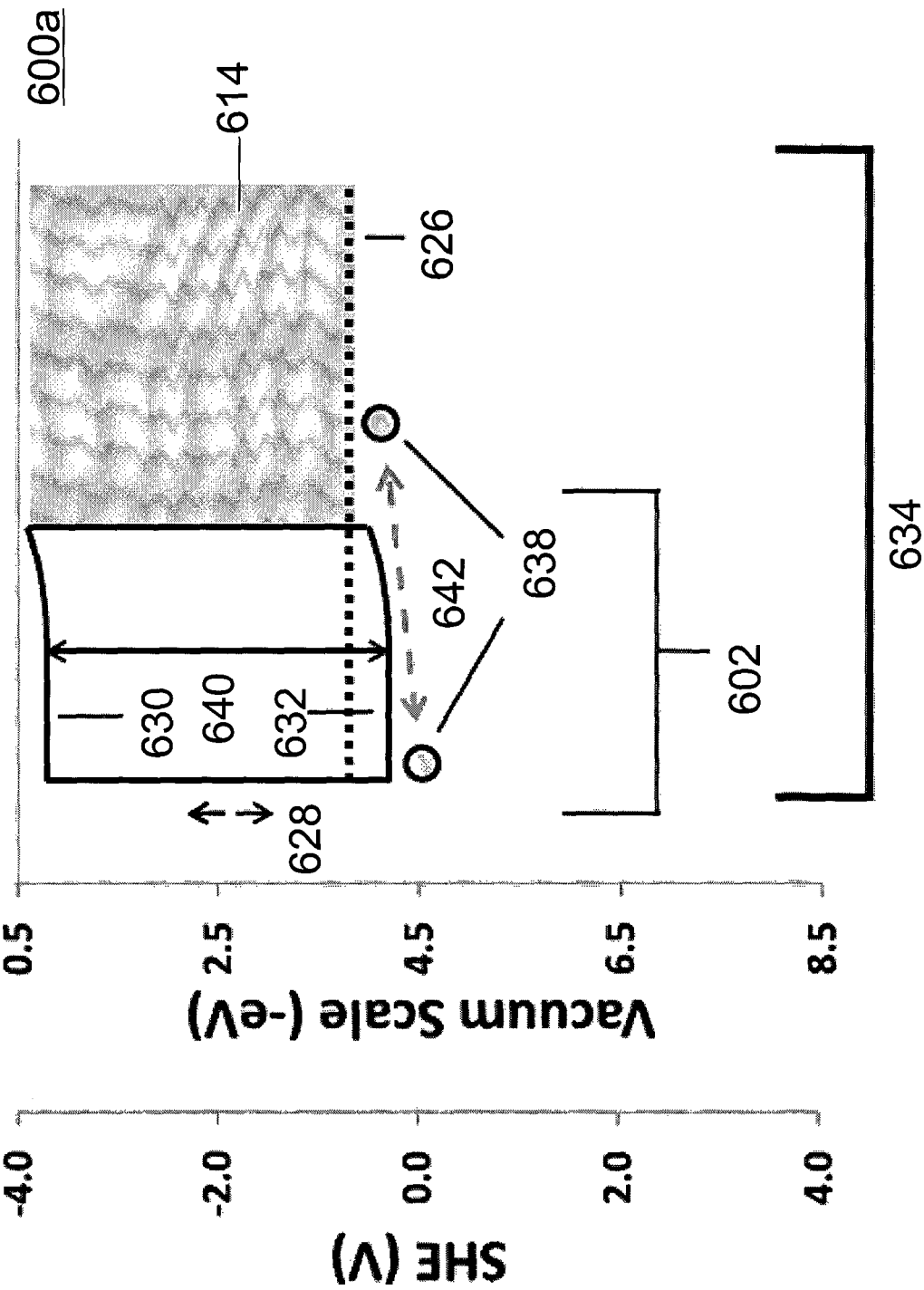
FIG. 6A shows a schematic of an energy band diagram of an ohmic contact of an electrode with an electrolyte.
Figure 6B:
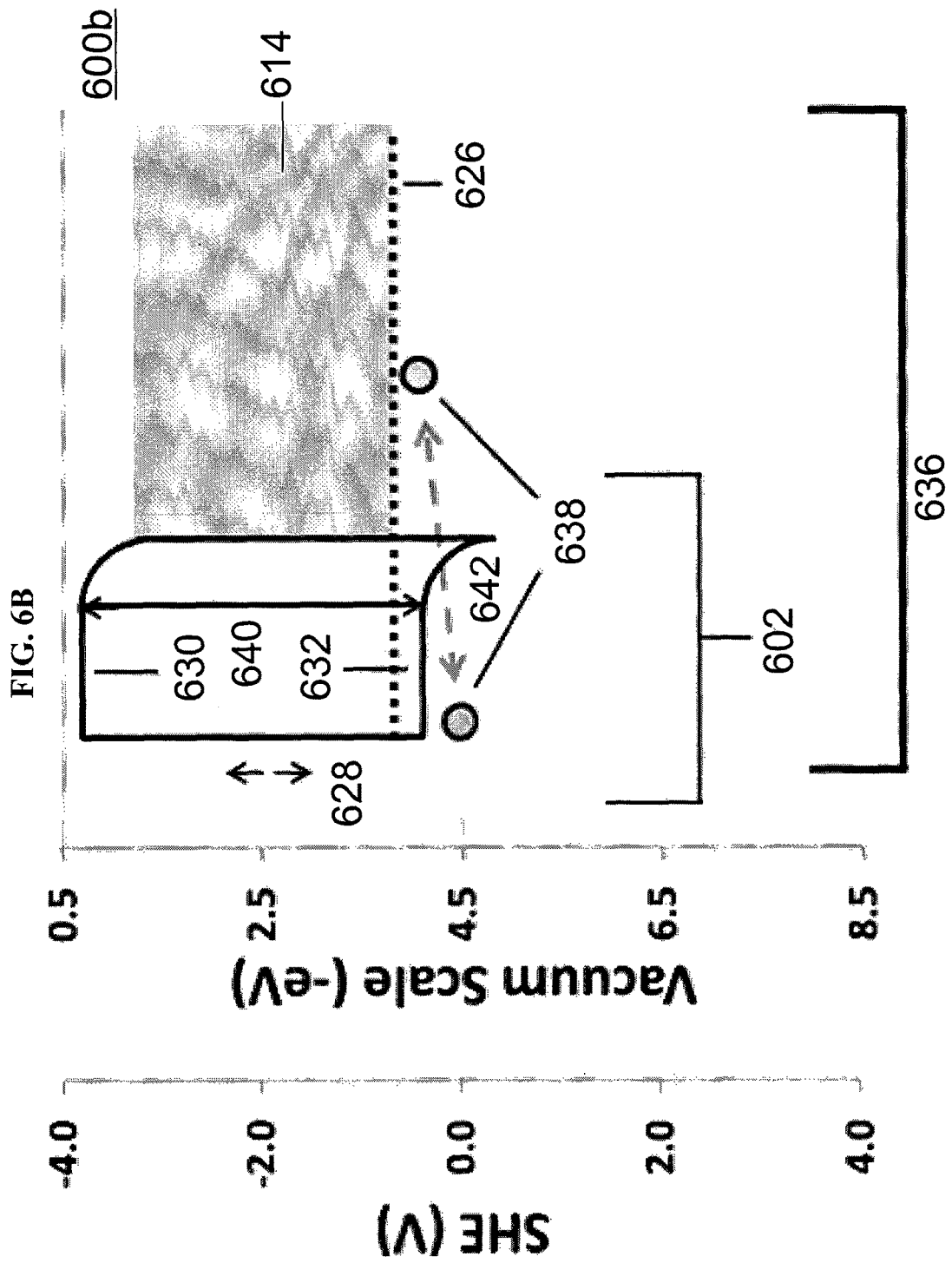
FIG. 6B shows a schematic 600b of an energy band diagram of a schottky contact of an electrode with an electrolyte.

FIGS. 6A and 6B show the analogous inverted designs to that shown in FIGS. 4A and 4B. FIG. 6A shows a schematic 600a of an energy band diagram of an ohmic contact 634 of an electrode 602 with an electrolyte 614. FIG. 6B shows a schematic 600b of an energy band diagram of a schottky contact 636 of an electrode 602 with an electrolyte 614. The electrode 602 may be a semiconductor electrode. The work function of the semiconductor may reaches equilibrium 626 with the redox potential(s) of the electrochemical species in the electrolyte 614 the semiconductor is in contact with. This results in an electric field near the interface, causing band shifting/bending 628 of the conduction band 630 as well as the valence band 632 of the semiconductor, with the field's parameters being functions of the entire system's other parameters. Depending on the valence band 632 and work function positions relative to vacuum (and standard hydrogen electrode (SHE)), either an ohmic contact 634 (shown in FIG. 6A) or rectifying/schottky contact 636 (shown in FIG. 6B) may be formed with the electrolyte 614. The electrodes in FIG. 6A and/or FIG. 6B may be the anode in a galvanic device using holes 638 as the primary charge carriers or the cathode in an electrolytic device using holes 638 as the primary charge carriers. For a reaction in the galvanic device, holes 638 may move from the valence band 632 of the semiconductor to the interface to be absorbed by the electrochemical species in the electrolyte 614 undergoing oxidation. For a reaction in the electrolytic device, holes 638 may move from the interface (where electrochemical species are undergoing reduction) to the valence band 632 of the semiconductor. 640 indicates the bandgap of the semiconductor. Arrows 642 illustrates the bidirectional nature of holes 638 from the conduction band 630 to and from the electrolyte 614.

Figure 7A:
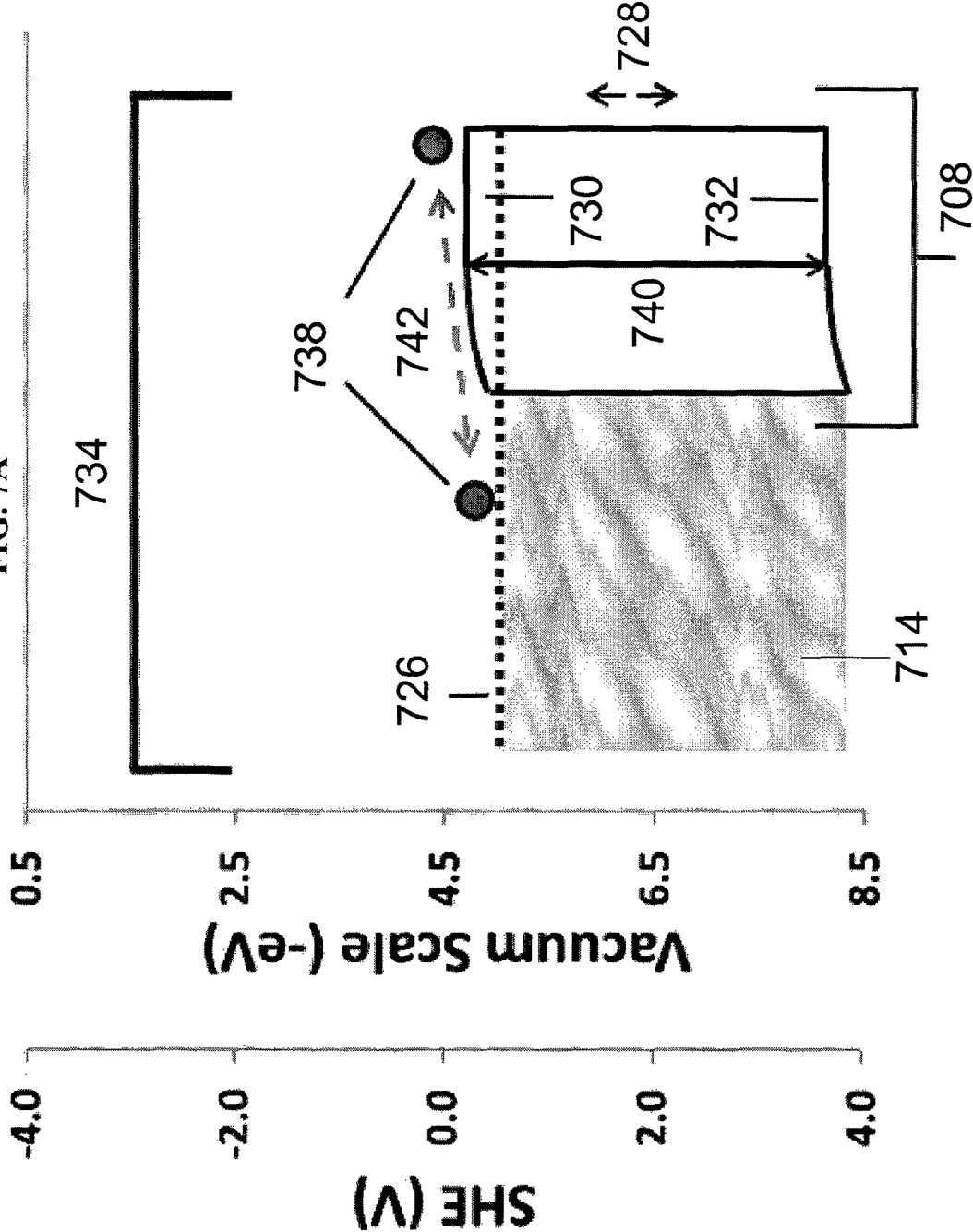
FIG. 7A shows a schematic of an energy band diagram of an ohmic contact of an electrode with an electrolyte.
Figure 7B:
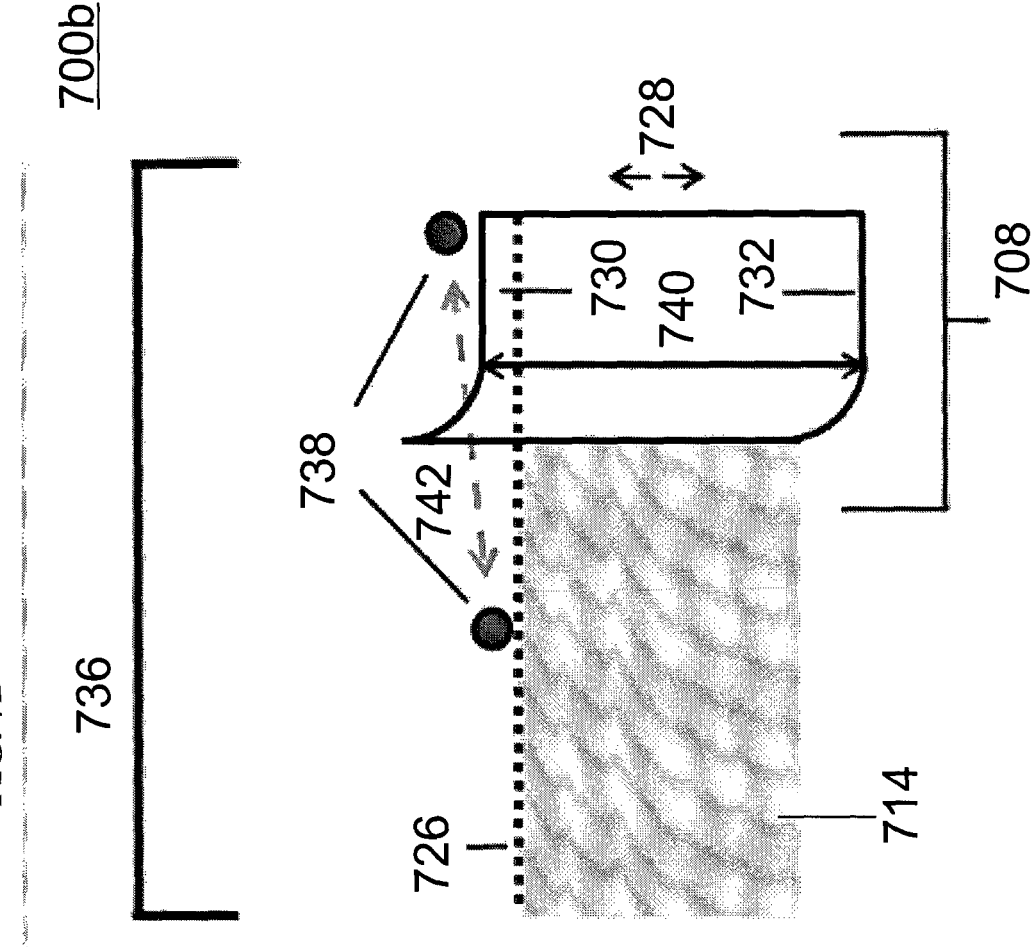
FIG. 7B shows a schematic of an energy band diagram of a schottky contact of an electrode with an electrolyte.
Figure 7B:
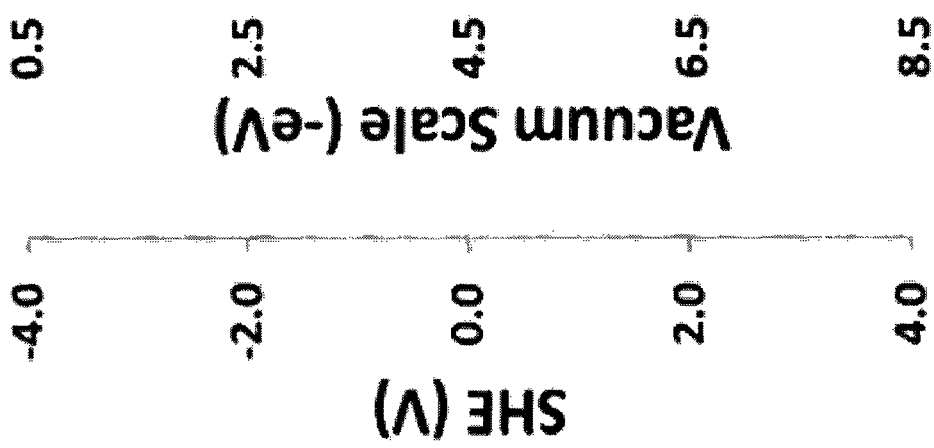

FIGS. 7A and 7B show the analogous inverted designs to that shown in FIGS. 5A and 5B. FIG. 7A shows a schematic 700a of an energy band diagram of an ohmic contact 734 of an electrode 708 with an electrolyte 714. FIG. 7B shows a schematic 700b of an energy band diagram of a schottky contact 736 of an electrode 708 with an electrolyte 714. The electrode 402 may be a semiconductor electrode. The work function of the semiconductor may reaches equilibrium 726 with the redox potential(s) of the electrochemical species in the electrolyte 714 the semiconductor is in contact with. This results in an electric field near the interface, causing band shifting/bending 728 of the conduction band 730 as well as the valence band 732 of the semiconductor, with the field's parameters being functions of the entire system's other parameters. Depending on the conduction band 730 and work function positions relative to vacuum (and standard hydrogen electrode (SHE)), either an ohmic contact 734 (shown in FIG. 7A) or rectifying/schottky contact 736 (shown in FIG. 7B) may be formed with the electrolyte 714. The electrode 708 in FIG. 7A and/or FIG. 7B may be the cathode in a galvanic device using electrons 738 as the primary charge carriers or the anode in an electrolytic device using electrons 738 as the primary charge carriers. For a reaction in the galvanic device, electrons 738 may move from the conduction band 730 of the semiconductor to the interface to be absorbed by the electrochemical species in the electrolyte 714 undergoing reduction. For a reaction in the electrolytic device, electrons 738 may move from the interface (where electrochemical species are undergoing oxidation) to the conduction band 730 of the semiconductor.

In various embodiments, one of the energy band diagrams in FIG. 4A or FIG. 4B may correspond to interface 120 in FIG. 1D or FIG. 1E. In various embodiments, one of the energy band diagrams in FIG. 5A or FIG. 5B may correspond to interface 122 in FIG. 1D or FIG. 1E. In various embodiments, one of the energy band diagrams in FIG. 6A or FIG. 6B may correspond to interface 120 in FIG. 1D or FIG. 1E. In various embodiments, one of the energy band diagrams in FIG. 7A or FIG. 7B may correspond to interface 122 in FIG. 1D or FIG. 1E.

In various embodiments, one of the energy band diagrams in FIG. 4A or FIG. 4B may correspond to interface 320 in FIG. 3A or FIG. 3B. In various embodiments, one of the energy band diagrams in FIG. 5A or FIG. 5B may correspond to interface 322 in FIG. 3A or FIG. 3B. In various embodiments, one of the energy band diagrams in FIG. 6A or FIG. 6B may correspond to interface 320 in FIG. 3A or FIG. 3B. In various embodiments, one of the energy band diagrams in FIG. 7A or FIG. 7B may correspond to interface 322 in FIG. 3A or FIG. 3B.

Figure 8A:
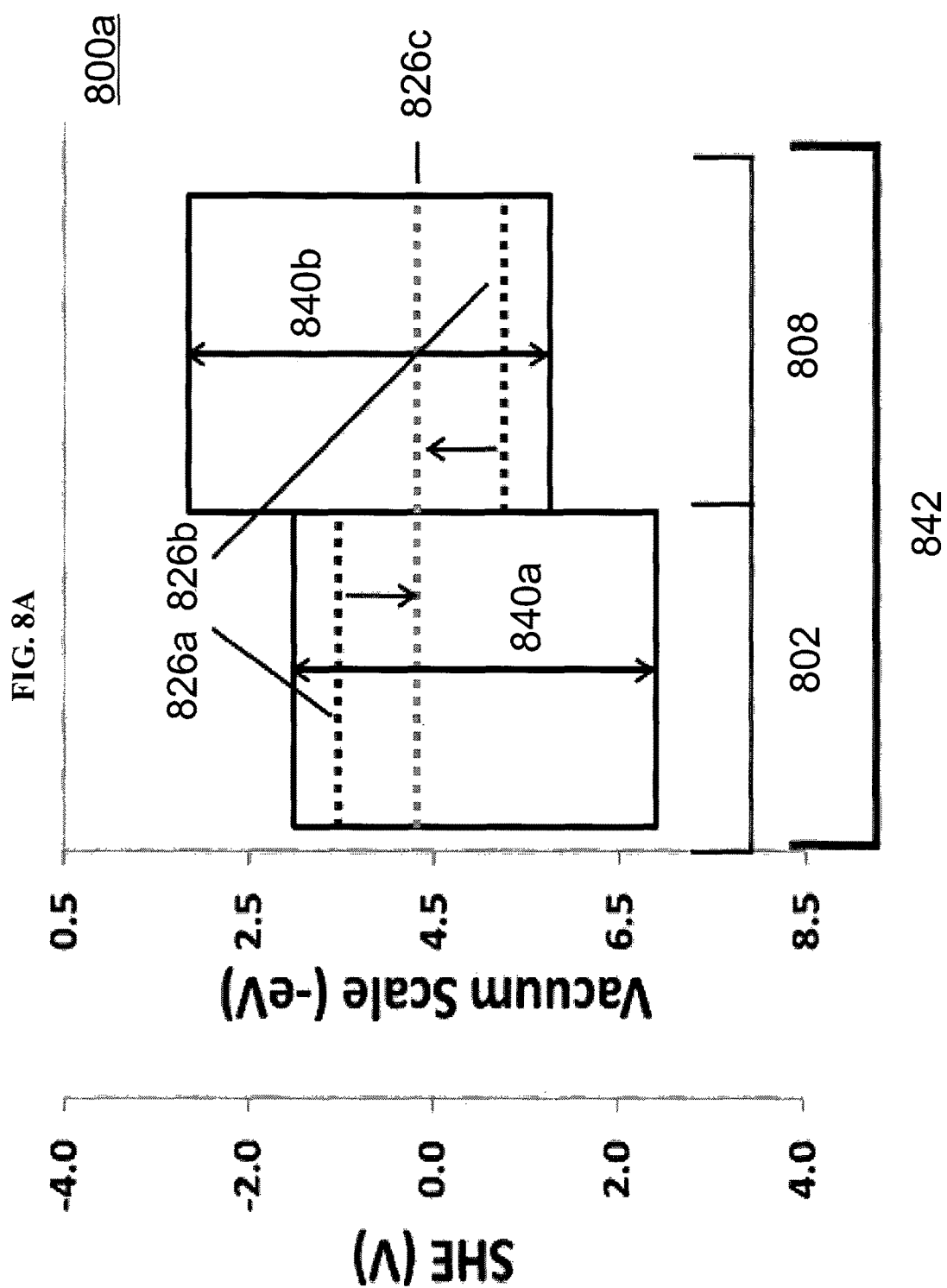
FIG. 8A shows a schematic of energy band diagram of a first electrode with a second electrode after the first electrode and the second electrode are brought into contact but before equilibrium is established according to various embodiments.

FIG. 8A shows a schematic 800a of energy band diagram of a first electrode 802 with a second electrode 808 after the first electrode 802 and the second electrode 808 are brought into contact but before equilibrium is established according to various embodiments. 842 may indicate the interface junction after the first electrode 802 and the second electrode 808 are brought into contact but before equilibrium is established. The first electrode 802 may have a bandgap 840a and the second electrode 808 may have a bandgap 840b. The bandgaps 840a, 840b may be the same or may be different. Before equilibrium is established, the first electrode 802 may have a workfunction potential 826a while the second electrode 808 may have a workfunction potential 826b.

Figure 8B:
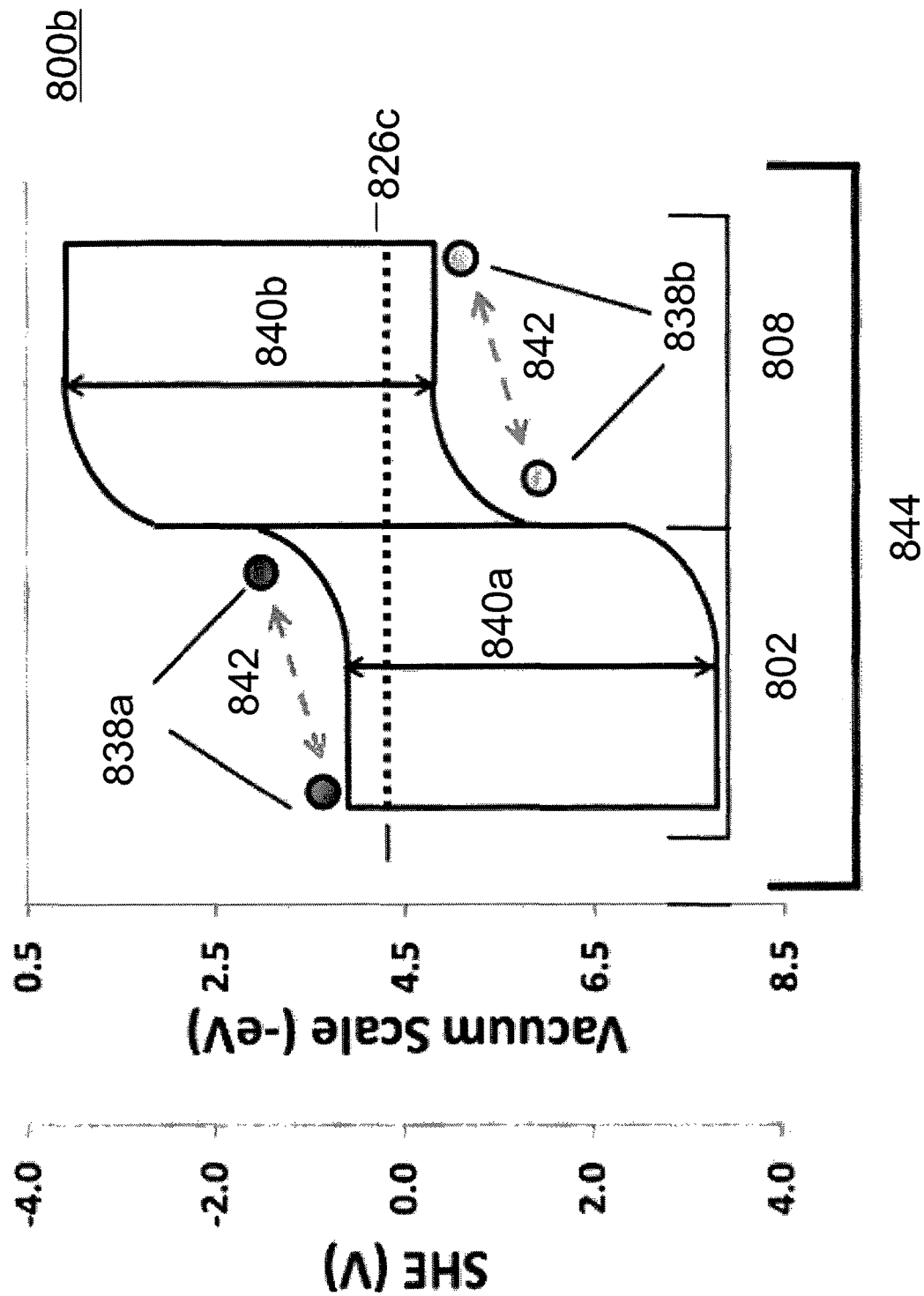
FIG. 8B shows a schematic of an energy diagram of an ohmic contact formed between the first electrode and the second electrode after the first electrode and the second electrode are brought into contact and after equilibrium is established according to various embodiments.

FIG. 8B shows a schematic 800b of an energy diagram of an ohmic contact 844 formed between the first electrode 802 and the second electrode 808 after the first electrode 802 and the second electrode 808 are brought into contact and after equilibrium is established according to various embodiments. The interface 844 between the first electrode 802 and the second electrode 808 may set up the charge separation and transport mechanism in the active device (i.e. separation and transport of electrons 838a and holes 838b) and may remove the need for the electrolyte to perform this function. There may be a shift in all band positions relative to one another on equilibrium. The first electrode 802 and the second electrode 804 may have a workfunction potential 826c at equilibrium. Since electrons 838a seek generally to move down and holes 838b generally seek to move up is the thermodynamics are favourable enough, the band bending and band positions may present paths of least resistance for holes 838b and electrons 838a to both move their preferred directions (though do not have to if external forces are applied). Electrons 838a and holes 838b may continue to proceed via their most favourable paths and recombine in a conductor (outside the depletion region, e.g. in the current collectors) to complete the electrical circuit.

Figure 9A:
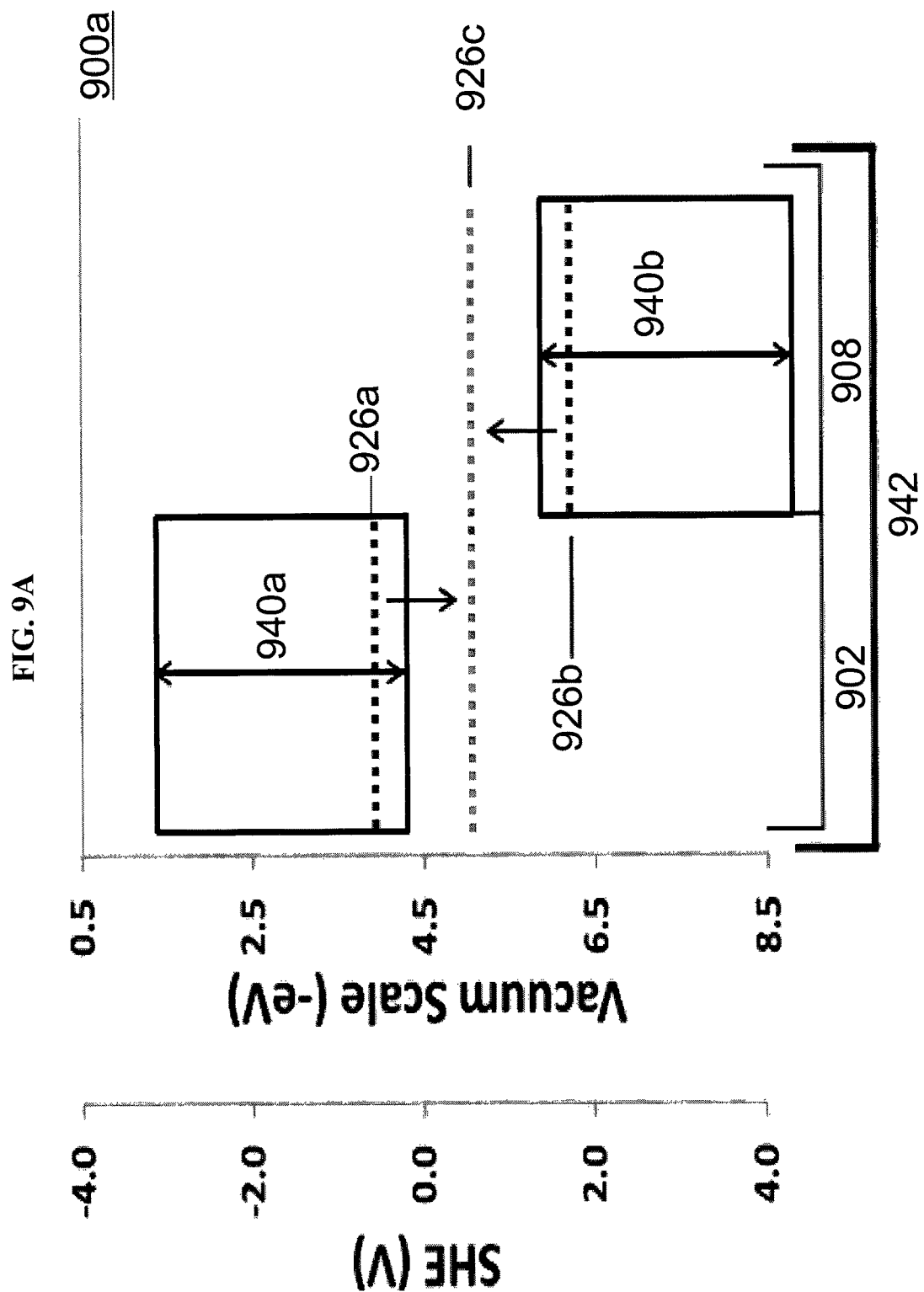
FIG. 9A shows a schematic of energy band diagrams of a first electrode with a second electrode after the first electrode and the second electrode are brought into contact but before equilibrium is established according to various embodiments.
Figure 9B:
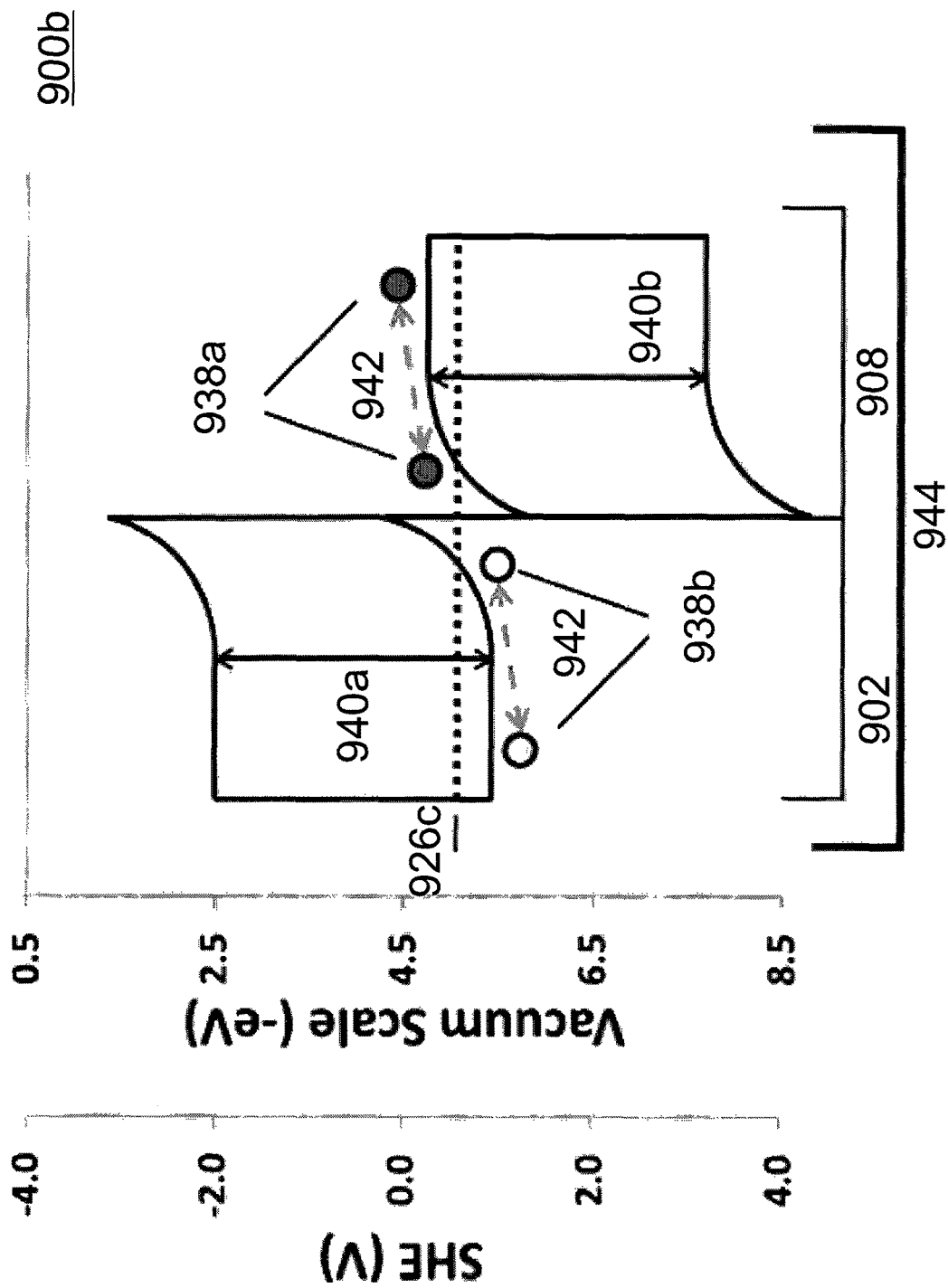
FIG. 9B shows a schematic of an energy diagram of a schottky contact formed between the first electrode and the second electrode after the first electrode and the second electrode are brought into contact and after equilibrium is established according to various embodiments.

FIGS. 9A and 9B show the analogous inverted designs to that shown in FIGS. 8A and 8B. FIG. 9A shows a schematic 900a of energy band diagrams of a first electrode 902 with a second electrode 908 after the first electrode 902 and the second electrode 908 are brought into contact but before equilibrium is established according to various embodiments. 942 may indicate the interface junction after the first electrode 902 and the second electrode 908 are brought into contact but before equilibrium is established. The first electrode 902 may have a bandgap 940a and the second electrode 908 may have a bandgap 940b. The bandgaps 940a, 940b may be the same or may be different. Before equilibrium is established, the first electrode 902 may have a work function potential 926a while the second electrode 908 may have a work function potential 926b.

FIG. 9B shows a schematic 900b of an energy diagram of a schottky contact 944 formed between the first electrode 902 and the second electrode 908 after the first electrode 902 and the second electrode 908 are brought into contact and after equilibrium is established according to various embodiments. The first electrode 902 and the second electrode 904 may have a workfunction potential 926c at equilibrium.

A person skilled in the art may arrive at the design of the electrochemical device through proper and through material selection and interface design by means of FIGS. 4A-B, 5A-B, 6A-B, 7A-B, 8A-B and 9A-B.

Figure 10A:
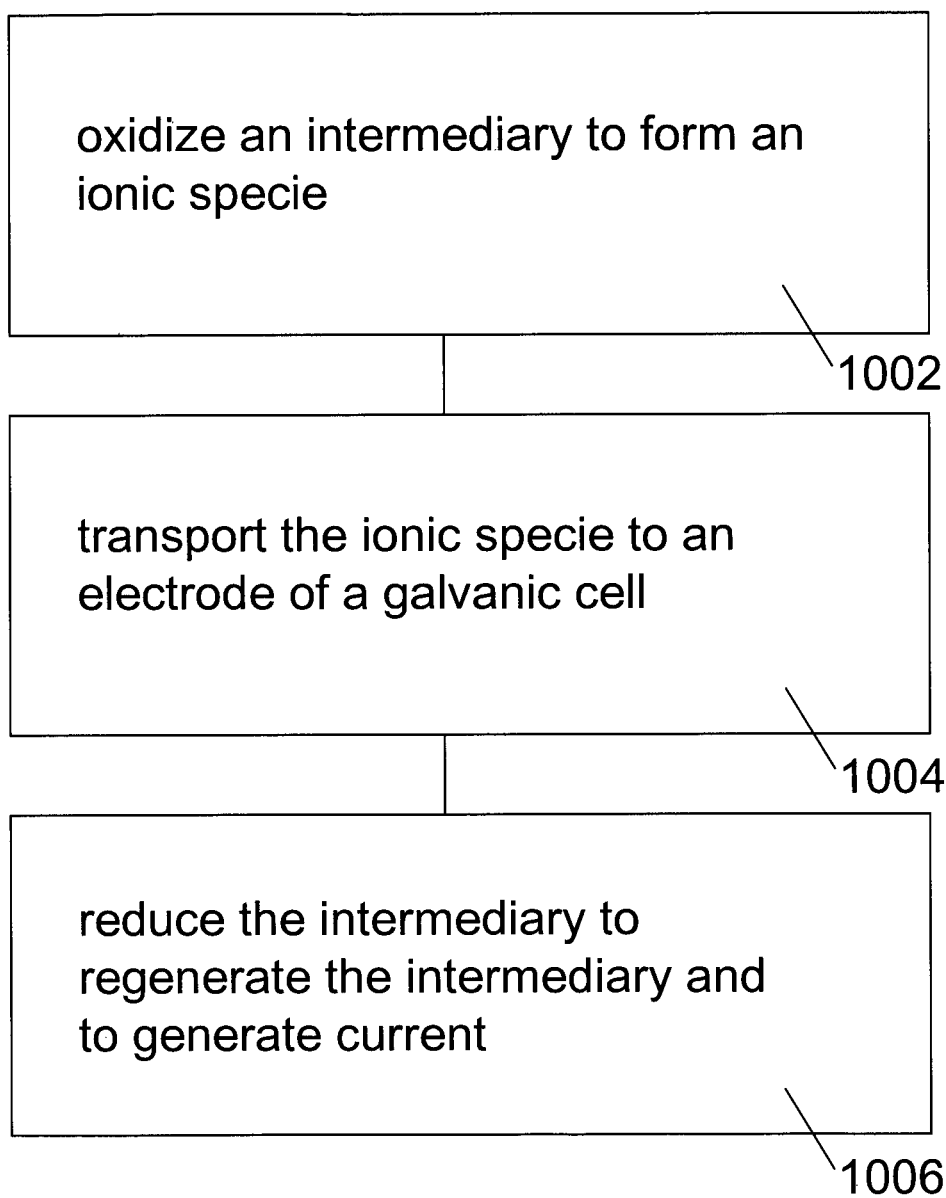
FIG. 10A is a schematic illustrating a method of generating current according to various embodiments.

FIG. 10A is a schematic 1000a illustrating a method of generating current according to various embodiments. The method may include, in 1002, oxidizing an intermediary to form an ionic specie. The method may further include, in 1004, transporting the ionic specie to an electrode of a galvanic cell. The method may also include, in 1006, reducing the intermediary to regenerate the intermediary and to generate current.

The method may include formation of ions at a location remote from the active device, i.e. the galvanic cell. The method may further transporting ions to an electrode, i.e. the cathode, of the galvanic cell. At the cathode, the ions may be reduced to regenerate the intermediary. Electrons may be used up or holes may be generated in the process. A galvanic cell may include a fuel cell or a metal-air battery.

The below mentioned reactions may occur at the cathode.

$$R + xO_2 + S \rightarrow R° + S \qquad (1)$$

$$R° + ye + S \rightarrow zP + R + S \qquad (2)$$

$$R° + S \rightarrow zP + yh + R + S \qquad (3)$$

For reaction (1), an intermediary R may be oxidized by a certain number of moles (x) of oxygen ($O_2$) to form an ionic specie R°. Reaction (1) may occur in a location away from the electrochemical cell. In other words, the ionic specie may be generated by oxidizing an intermediary in a location away from the electrochemical cell. The ionic specie R° may then be reduced in Reaction (2) or Reaction (3) to form z moles of product P. The intermediary R may be regenerated in Reaction (2) or Reaction (3). For Reaction (2), holes may be the primary charge carrier. For Reaction (3), holes may be the primary charge carrier. Other species S may also participate in Reaction (1), Reaction (2) and/or Reaction (3) to fully enable the completion of Reaction (1), Reaction (2) and/or Reaction (3) or assist in the rate of the reactions. In other words, current may be generated by consuming electrons or by generating holes.

Figure 10B:
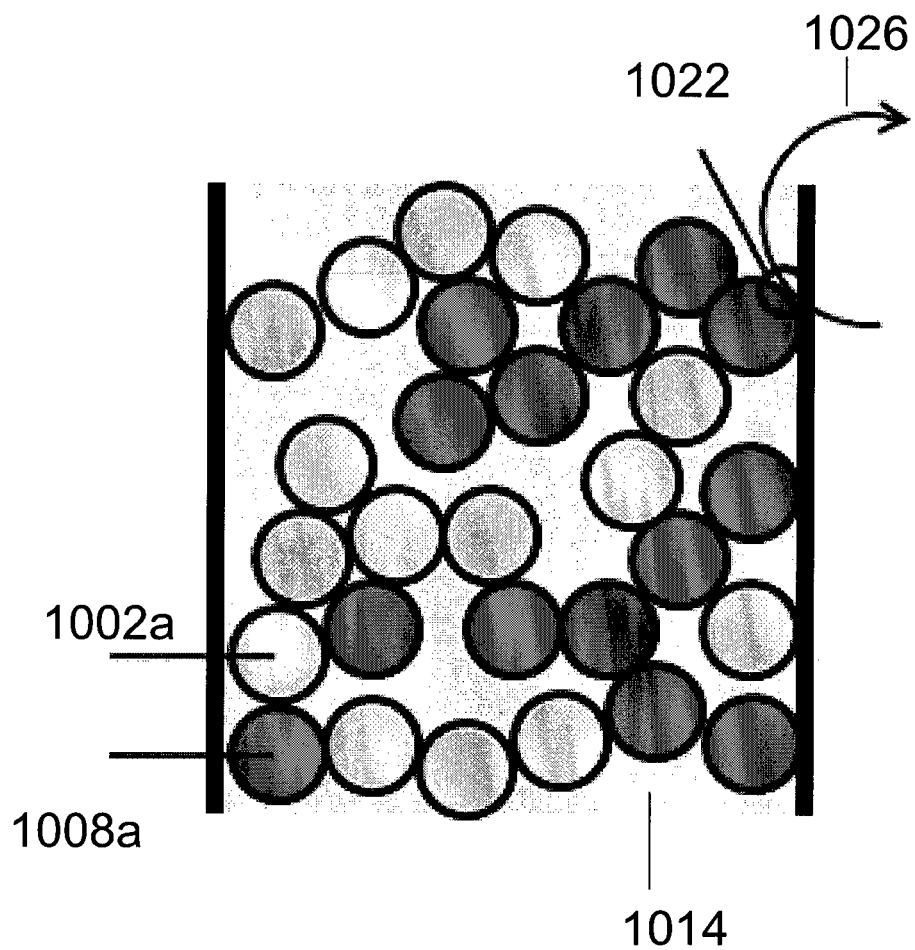
FIG. 10B is a schematic showing the method of generating current according to various embodiments.

In various embodiments, the method of generating current shown in FIG. 10A may be used in the galvanic cells illustrated in FIGS. 1A-E or FIGS. 3A-B. FIG. 10B is a schematic 1000b showing the method of generating current according to various embodiments. The first electrode may include one or more first particles. The second electrode may include one or more second particles. At least one second particle 1008a may form an interface 1022 with an electrolyte 1014. The electrolyte 1014 may transport the ionic specie to at least one second particle 1008a. Reaction (2) or (3) may occur at the interface 1022 and the intermediary 1026 may be regenerated.

FIG. 11 is a schematic 1100 showing a method of fabricating an electrochemical cell according to various embodiments. The method may include in 1102, providing a first electrode including a first metal oxide layer, the first layer having a first surface. The method may further include in 1104, providing a second electrode including a second metal oxide layer, the second layer having a second surface such that the second layer is parallel to the first layer and the first surface is in physical contact with the second surface. The method may additionally include in 1106, physically contacting the first electrode and the second electrode with an electrolyte.

In other words, the method may include providing a first electrode and a second electrode. The first electrode may include a first metal oxide layer. The second electrode may include a second metal oxide layer. The first electrode and the second electrode may be arranged such that the first layer is parallel to the second layer. The first electrode may be in direct physical contact with the second electrode. The method may also include providing an electrolyte such that the electrolyte may be in direct physical contact with the first electrode and the second electrode.

Methods described herein may further contain analogous features of any device described herein. Correspondingly, devices described herein may further contain analogous features of any methods described herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An electrochemical cell which reversibly converts chemical potential energy from a species into electrons comprising, in combination:
   a first electrode and a first current collector electrically connected to the first electrode; and
   a second electrode and a second current collector electrically connected to the second electrode;
   wherein the first electrode is in direct physical contact with the second electrode at an interface forming a depletion region; and
   wherein at least one of the first and second electrode comprises a semiconductor formed as a first metal oxide layer, and in response to introduction of the species at the first electrode the species is oxidized at the first electrode and an oxidant is reduced at the second electrode; first
   wherein the first current collector is positioned on a surface of the first electrode opposite the first surface, and the second current collector is positioned on a surface of the second electrode opposite the second surface, such that electrons are transported between the first electrode and the second electrode via the current collector, and electrons do not pass from the first electrode to the second electrode through the depletion region.

2. The electrochemical cell of claim 1, wherein the first electrode comprises a first semiconductor formed as the first metal oxide layer, and the second electrode comprises a second semiconductor formed as a second metal oxide layer.

3. The electrochemical cell of claim 2, wherein the first semiconductor comprises a material different from the second semiconductor.

4. The electrochemical cell of claim 1, wherein the depletion region allows for ions to pass between the electrodes.

5. The electrochemical cell of claim 1, further comprising a load having a first end and a second end;
   wherein the first end of the load is in electrical connection with the first electrode; and
   wherein the second end of the load is in electrical connection with the second electrode.

6. The electrochemical cell of claim 1, further comprising:
   a power supply having a first end and a second end;

wherein the first end of the power supply is in electrical connection with the first electrode; and wherein the second end of the power supply is in electrical connection with the second electrode.

7. An electrochemical cell which reversibly converts chemical potential energy from an electrochemical species into electrons, made by the process comprising the steps of:

bringing a first surface of a first electrode into direct physical contact with a second surface of a second electrode; and forming a depletion region at an interface between the first surface and the second surface once electrical equilibrium has been established, wherein ions can pass between electrodes through the depletion region, but electrons do not pass between electrodes through the depletion region.

8. The electrochemical cell of claim 7 further comprising the step of attaching a current collector to the electrodes such that in response to introduction of the electrochemical species at the first electrode current flows between the electrodes through the current collector.

9. The electrochemical cell of claim 2, wherein the first semiconductor comprises a material which is the same as the second semiconductor.

* * * * *